United States Patent [19]
Hosaka et al.

[11] Patent Number: 6,020,923
[45] Date of Patent: Feb. 1, 2000

[54] METHOD AND APPARATUS FOR CODING AND RECORDING AN IMAGE SIGNAL AND RECORDING MEDIUM FOR STORING AN IMAGE SIGNAL

[75] Inventors: Kazuhisa Hosaka, Saitama; Yoichi Yagasaki, Kanagawa, both of Japan

[73] Assignee: Sony Corporation, Tokyo, Japan

[21] Appl. No.: 08/882,889

[22] Filed: Jun. 26, 1997

[30] Foreign Application Priority Data

Jul. 1, 1996 [JP] Japan ..................................... 8-171256

[51] Int. Cl.$^7$ ....................................................... H04N 7/12
[52] U.S. Cl. .......................... 348/409; 348/415; 348/418; 348/429; 348/448; 382/234; 386/108; 386/123; 358/136
[58] Field of Search ...................................... 348/384, 390, 348/397, 398, 409, 413, 415, 420, 445–449; 382/190, 232, 233, 234, 236, 238, 249; 386/37, 92, 108, 95, 123; 358/136, 335; H04N 7/12

[56] References Cited

U.S. PATENT DOCUMENTS

| | | | |
|---|---|---|---|
| 5,235,420 | 8/1993 | Gharavi ..................................... | 358/136 |
| 5,317,413 | 5/1994 | Yanagihara .............................. | 358/335 |
| 5,339,167 | 8/1994 | Kuroda .................................... | 358/339 |
| 5,398,078 | 3/1995 | Masuda et al. .......................... | 348/699 |
| 5,436,665 | 7/1995 | Ueno et al. ............................... | 348/412 |
| 5,677,735 | 10/1997 | Ueno et al. .............................. | 348/415 |
| 5,870,502 | 2/1999 | Bonneau et al. ......................... | 382/249 |

*Primary Examiner*—Tommy P. Chin
*Assistant Examiner*—Tung Vo
*Attorney, Agent, or Firm*—Frommer Lawrence & Haug, LLP.; William S. Frommer

[57] ABSTRACT

A method and apparatus for coding and decoding an image signal, and also a recording medium for storing a coded image signal wherein low resolution image signal including a plurality of pixels and also a high resolution image signal including a plurality of pixels are received. The low resolution image signal is coded thereby generating a resultant coded low resolution image signal. The high resolution image signal is predicted from the low resolution image signal thereby generating a predicted high resolution image signal. After that, the predicted high resolution image signal is divided into a plurality of blocks each including n×m pixels. The feature of each block is detected and a judgement code corresponding to the detected feature is generated. Then a coding table is selected in accordance with the judgement code. The n×m pixels in the corresponding block of the high resolution image signal are coded using the selected coding table to generate coded data. In the above process, instead of directly coding the high resolution image signal, the difference between the high resolution image signal and the predicted high resolution image may be coded. The image signal can be compressed in a highly efficient fashion by coding the low resolution image signal and high resolution image signal.

34 Claims, 23 Drawing Sheets

↓ PREDICTION OF HIGH RESOLUTION IMAGE

↓ FRAME EXPANSION

↓ DIVISION INTO BLOCK

FRAME REDUCTION ↓ ↑ FRAME EXPANSION

INTEGRATION INTO FRAME ↑ ↓ DIVISION INTO BLOCK

FIG. 9

111 swap_type0   swap_type1   swap_type2   swap_type3   swap_type4   swap_type5

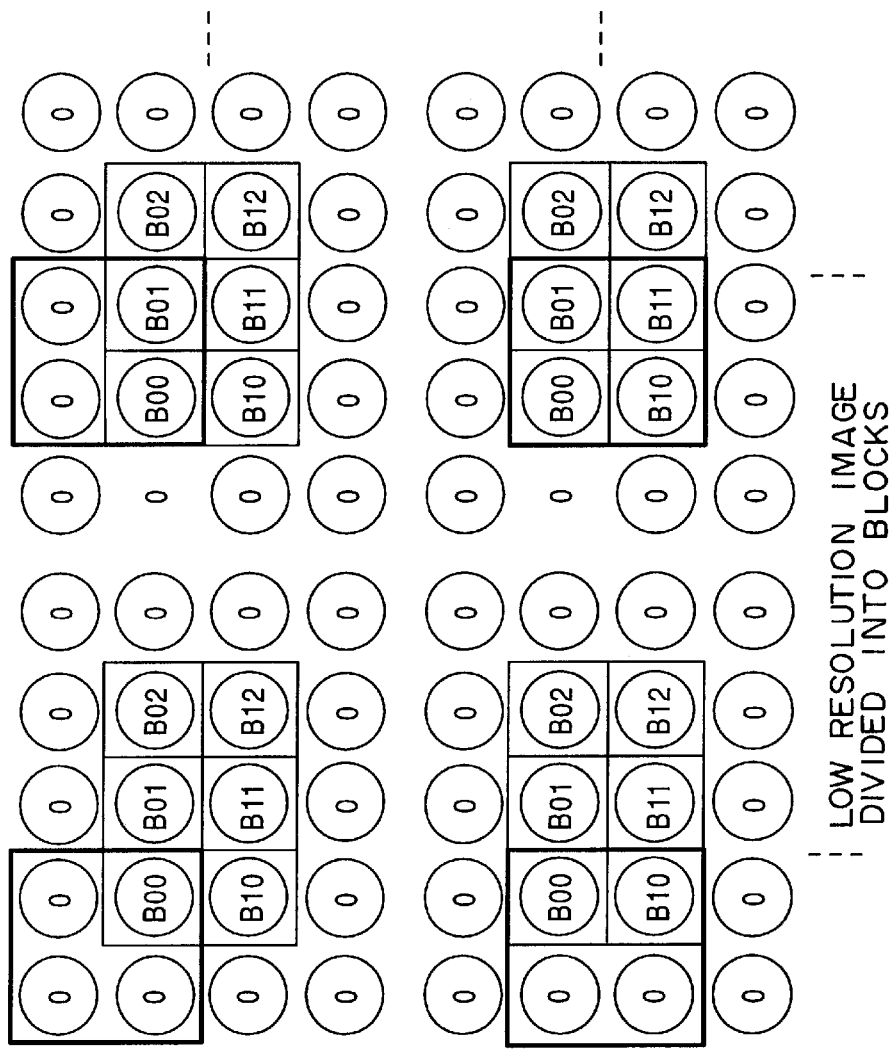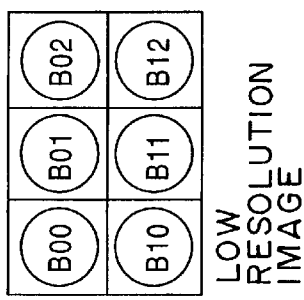

METHOD AND APPARATUS FOR CODING AND RECORDING AN IMAGE SIGNAL AND RECORDING MEDIUM FOR STORING AN IMAGE SIGNAL

BACKGROUND OF THE INVENTION

1. Field of the Invention

The present invention relates to a method and apparatus for coding an image signal, a method and apparatus for decoding an image signal, and a recording medium for storing an image signal. More particularly, the present invention relates to a method and apparatus for coding an image signal, a method and apparatus for decoding an image signal, and a recording medium for storing an image signal, which are suitable to transmit an image signal using a transmission system including various transmission lines such as an analog or digital telephone line or a private data transmission line at various transmission rates, suitable to receive an image signal, and suitable to record and reproduce an image signal onto or from a recording medium such as a magnetic disk or RAM having various storage capacities.

2. Description of the Related Art

As shown in FIG. 21, when substantially the same image is represented by a plurality of image signals having different spatial resolutions (a high resolution image signal and a low resolution image signal), if these image signals are coded into a single bit-stream, then it is possible to display the image on a plurality of display devices having different spatial resolutions (a high resolution display device and a low resolution display device) using the single bit-stream.

It is known in the art that if a high resolution image is predicted from a low resolution image, and the low resolution image and the predicted high resolution image are coded into a single bit-stream, then the coding is performed in a highly efficient fashion than the low resolution image and the high resolution image are directly coded. That is, as shown in FIG. 22, a low resolution image is coded first, and then a high resolution image is predicted from the low resolution image. The difference between the high resolution image and the predicted image is then calculated and the result is coded into a bit stream. As a result, as shown in FIG. 23, the low resolution image can be reproduced by decoding a part of the bit stream (the low resolution image data), and the high resolution image can be reproduced by decoding the whole of the bit stream (the low resolution image and difference image) and combining the decoded data.

The coding process shown in FIG. 22 can be performed using a coding apparatus such as that shown in FIG. 24. With the coding apparatus shown in FIG. 24, a low resolution image and a high resolution image are input separately via a low resolution image input terminal 1 and a high resolution image input terminal 4, respectively, ad these images are coded in a hierarchical fashion. The resultant data is output via a high/low resolution image coded data output terminal 8.

The image data input via the low resolution image input terminal 1 is coded by a low resolution image coder 2 and resultant data is supplied to a multiplexer 7. The data coded by the low resolution image coder 2 is also locally decoded, and the locally decoded image data is supplied to a high resolution image predictor 3. The high resolution image predictor 3 predicts a high resolution image from the locally decoded image. A difference calculator 5 calculates the difference between the high resolution image input via the high resolution image input terminal 4 and the predicted high resolution image. The resultant difference image is then coded by a difference image coder 6 into a difference image coded data. A multiplexer 7 multiplexes the difference image coded data with the low resolution image coded data supplied from the low resolution image coder 2 into a high/low resolution coded data (bit stream). The resultant data is output via a high/low resolution image coded data output terminal 8. The bit stream is transmitted to the decoding apparatus shown in FIG. 25 via a recording medium 9 or a transmission line 10.

The decoding process shown in FIG. 23 can be implemented by the decoding apparatus shown in FIG. 25. The high/low resolution coded data (the coded data (bit stream) output from the high/low resolution image coded data output terminal 8 shown in FIG. 24) is input via the recording medium 9 or the transmission line 10 to the high/low resolution coded data input terminal 11 of the decoding apparatus shown in FIG. 25. The hierarchically coded data of the high/low resolution image is decoded into a low resolution image and high resolution image, and output via a low resolution image output terminal 14 and high resolution image output terminal 18, respectively.

In the decoding apparatus, the hierarchical data of the high/low resolution image (high/low resolution coded data in the form of bit stream) received via the high/low resolution coded data input terminal 11 is demultiplexed by a demultiplexer 15 into low resolution image coded data and difference image coded data. The low resolution image coded data is then decoded by a low resolution image decoder 12. To display the low resolution image, the data of low resolution image is transmitted via the low resolution image output terminal 14 to a low resolution monitor (not shown). On the other hand, the high resolution image is predicted by a high resolution image predictor 13 from the low resolution image, and the predicted image is added via an adder 17 with the difference image decoded from the difference image coded data by a difference image decoder 16 thereby generating high resolution image data. The resultant high resolution image data is transmitted via a high resolution image output terminal 18 to a high resolution monitor (not shown) and displayed thereon.

The hierarchical coding technique described above is suitable to code a hard key signal, which is a bilevel image signal. Herein the key signal refers to such a signal which represents the shape of an object by indicating whether specific areas are inside or outside the object. The hard key signal is used when a particular object is extracted from an image and combined with another background image. The hard key signal refers to a key signal which represents whether a particular point is located inside or outside the object using a bilevel signal (for example 1 and 0). The original image from which the key signal is extracted is called a fill image. In the example shown in FIG. 26, when the fill image includes a human figure and the sun taken outdoors, only the image of the human figure is extracted using a key signal and combined with a background image including mountains thereby generating a new mixed image.

The hard key signal is similar to a facsimile signal in that both are bilevel image signals. Therefore, in conventional techniques, the hard key signal is coded in a direct fashion (not in a hierarchical fashion) using the MMR (Modified Modified Read) technique, the chain coding technique in which coding is performed by representing a boundary line between the inside and outside of an object by a chain of arrows each having a starting point and a direction, or the quad tree technique in which the special case where all leaves are the same is prohibited. However, the hard key signal cannot be coded in a highly efficient fashion by these techniques.

In view of the above, it is an object of the present invention to provide a method and apparatus for coding and decoding an image in a highly efficient fashion.

SUMMARY OF THE INVENTION

According to an aspect of the invention, there is provided a coding apparatus for coding an image signal, including:

means for receiving a low resolution image signal consisting of a plurality of pixels as well as a high resolution image signal consisting of a plurality of pixels, the high resolution image signal having a higher resolution than the low resolution image signal;

first coding means for coding the low resolution image signal;

predicting means for predicting the high resolution image signal from the low resolution image signal thereby generating a predicted high resolution image signal;

judgement means for dividing the predicted high resolution image signal into a plurality of blocks each including n×m pixels, and then detecting the feature of each block and finally outputting a judgement code corresponding to the feature; and second coding means for selecting a coding table in accordance with the judgement code and then coding the n×m pixels in the corresponding block of the high resolution image signal using the selected coding table.

According to another aspect of the invention, there is provide a method of coding an image signal, including:

the step of receiving a low resolution image signal consisting of a plurality of pixels as well as a high resolution image signal consisting of a plurality of pixels, the high resolution image signal having a higher resolution than the low resolution image signal;

the first coding step of coding the low resolution image signal;

the predicting step of predicting the high resolution image signal from the low resolution image signal thereby generating a predicted high resolution image signal;

the detecting step of dividing the predicted high resolution image signal into a plurality of blocks each including n×m pixels, and then detecting the feature of each block and finally outputting a judgement code corresponding to the feature; and the second coding step of selecting a coding table in accordance with the judgement code and then coding the n×m pixels in the corresponding block of the high resolution image signal using the selected coding table.

According to still another aspect of the invention, there is provided a decoding apparatus for decoding a coded data, the coded data including a coded low resolution image signal generated by coding a low resolution image signal and also including a coded high resolution image signal generated by coding a high resolution image signal, the decoding apparatus including:

first decoding means for decoding the coded low resolution image signal thereby generating a decoded low resolution image signal;

predicting means for predicting the high resolution image signal from the decoded low resolution image signal thereby generating the predicted high resolution image signal;

judgement means for dividing the predicted high resolution image signal into a plurality of blocks each including n×m pixels, and then detecting the feature of each block and finally outputting a judgement code corresponding to the feature; and second decoding means for selecting a coding table in accordance with the judgement code and then decoding the coded high resolution image signal using the selected coding table thereby generating a decoded high resolution image signal.

According to a further aspect of the invention, there is provided a method of decoding a coded data, the coded data including a coded low resolution image signal generated by coding a low resolution image signal and also including a coded high resolution image signal generated by coding a high resolution image signal, the method including:

the first decoding step of decoding the coded low resolution image signal thereby generating a decoded low resolution image signal;

the predicting step of predicting the high resolution image signal from the decoded low resolution image signal thereby generating the predicted high resolution image signal;

the detecting step of dividing the predicted high resolution image signal into a plurality of blocks each including n×m pixels, and then detecting the feature of each block and finally outputting a judgement code corresponding to the feature; and second decoding means for selecting a coding table in accordance with the judgement code and then decoding the coded high resolution image signal using the selected coding table thereby generating a decoded high resolution image signal.

According to another aspect of the invention, there is provided a recording medium for storing a coded image signal which can be decoded by a decoding apparatus, the coded image signal including a coded low resolution image signal and a coded high resolution image signal, the coded low resolution image signal and the coded high resolution image signal being generated by the process including the steps of:

encoding the low resolution image signal;

predicting the high resolution image signal from the low resolution image signal thereby generating a predicted high resolution image signal;

dividing the predicted high resolution image signal into a plurality of blocks each including n×m pixels, and then detecting the feature of each block and finally outputting a judgement code corresponding to the feature; and selecting a coding table in accordance with the judgement code and then coding the n×m pixels in the corresponding block of the high resolution image signal using the selected coding table.

According to still another aspect of the invention, there is provided a recording medium for storing a coded image signal which can be decoded by a decoding apparatus, the coded image signal including a coded low resolution image signal and a coded difference image signal, the coded low resolution image signal and the coded difference image signal being generated by the process including the steps of:

encoding the low resolution image signal;

predicting the high resolution image signal from the low resolution image signal thereby generating a predicted high resolution image signal;

dividing the predicted high resolution image signal into a plurality of blocks each including n×m pixels, and then detecting the feature of each block and finally outputting a judgement code corresponding to the feature; and calculating the difference between the high resolution image signal and the predicted high resolution image signal and outputting the resultant difference image signal; and selecting a coding table in accordance with the judgement code and then coding the n×m pixels in the corresponding block of the difference image signal using the selected coding table.

BRIEF DESCRIPTION OF THE DRAWINGS

FIG. 9 illustrates another example of a VLC table stored in the VLC coder shown in FIG. 1;

FIG. 20 is a schematic representation of the process of dividing an image into blocks in the prediction of a high resolution image;

DESCRIPTION OF THE PREFERRED EMBODIMENTS

The present invention will be described in further detail below with reference to preferred embodiments in conjunction with the accompanying drawings. In the following embodiments, by way of example, the "high resolution" refers to the resolution 2 times higher than the "low resolution" in both horizontal and vertical directions. That is, if the low resolution image includes W and H pixels along the horizontal and vertical directions, respectively, then the high resolution image includes 2W and 2H pixels along the horizontal and vertical directions, respectively.

The pixels of a low resolution image are represented by $B(x, y)$ ($x=\{0, 1, \ldots, W-1\}$, $y=\{0, 1, \ldots, H-1\}$) and the pixels of a high resolution image are represented by $U(x, y)$ ($x=\{0, 1, \ldots, 2W-1\}$, $y=\{0, 1, \ldots, 2H-1\}$). Furthermore, in the following embodiments, coding is performed block by block wherein each block has a size of 2 pixels×2 pixels.

Figure 1:
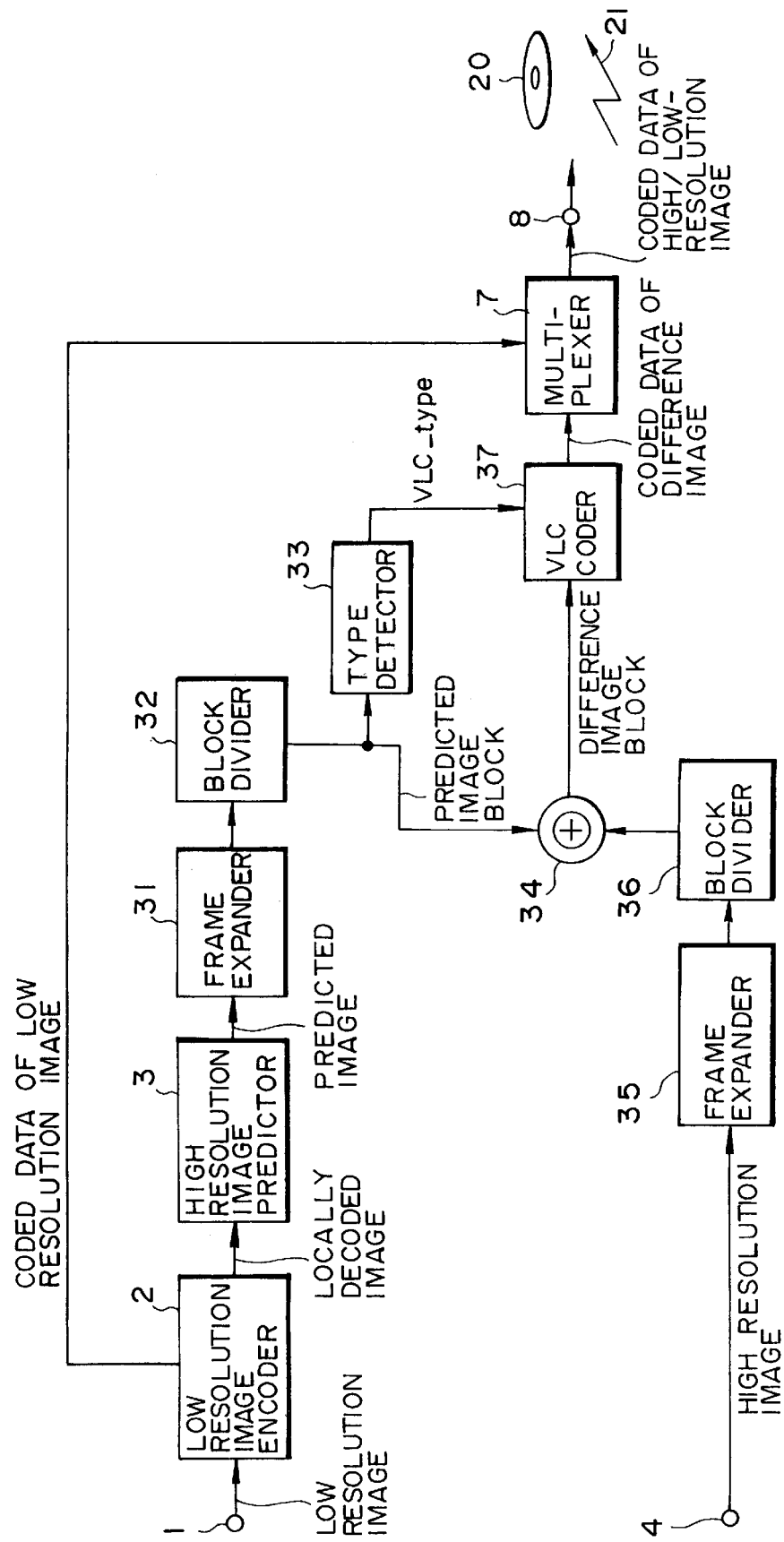
FIG. 1 is a block diagram illustrating a coding apparatus according to the invention.
Figure 24:
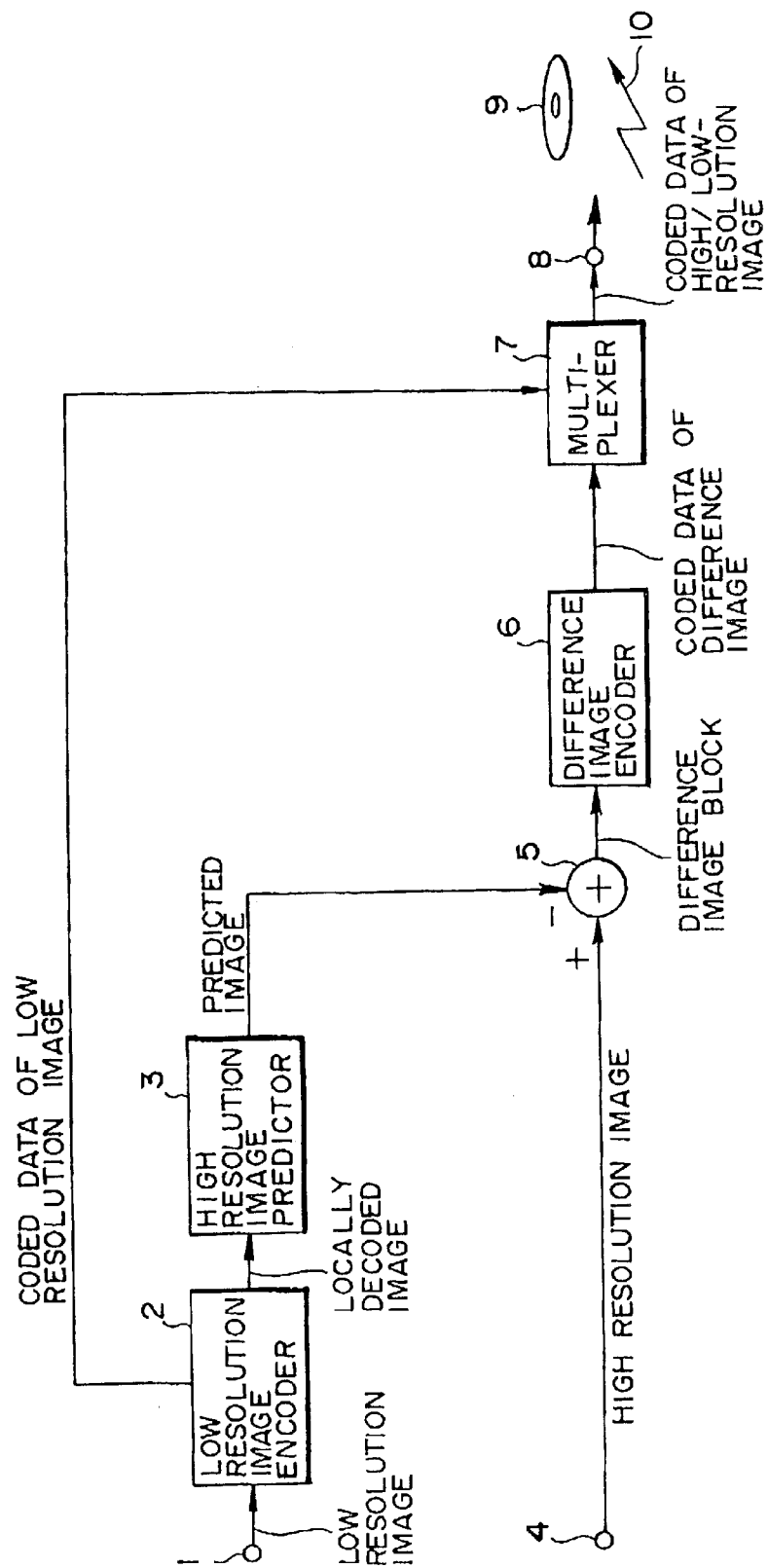
FIG. 24 is a block diagram illustrating a conventional coding apparatus.

FIG. 1 illustrates a first embodiment of the invention. In this embodiment, a bilevel image with a high resolution and a bilevel image with a low resolution are coded in a hierarchical fashion for example frame by frame. As opposed to the technique shown in FIG. 24, the apparatus of the present embodiment performs coding operation in a different manner as described below.

A high resolution image predictor 3 predicts an image from a locally decoded image. The predicted image is then converted in format by a frame expander 31 and block divider 32. Similarly, a high resolution image is converted in format by a frame expander 35 and a block divider 36. Exclusive OR (difference image) between the output of the block divider 32 and the output of the block divider 36 is calculated by an exclusive-OR gate 34, and the result is supplied to a VLC coder 37. A type detector 33 detects the type of the output of the block divider 32 and generates a VLC_type signal in accordance with the detected type. The VLC coder 37 codes each block of the difference image with reference to a VLC table selected in accordance with the VLC_type. The other parts of the coding apparatus are constructed in a similar manner to those of the coding apparatus shown in FIG. 24, and therefore those similar parts are denoted by similar reference numerals and the duplicated description thereof is not given here.

The operation of the present embodiment is described in further detail below. The low resolution image input via the low resolution image input terminal 1 is coded by the low resolution image coder 2. The coded low resolution image is locally decoded. The bilevel low resolution image may be coded by the low resolution image coder 2 using a proper coding technique such as the MMR technique, the chain coding technique, the quad tree technique, etc.

The high resolution image predictor 3 may be implemented by an upsample filter. This filter repeatedly performs a simple process described by:

$$U(2x+i, 2y+j) = B(x,y) \tag{1}$$

wherein i, j={0, 1}, x={0, 1, ..., W–1}, y={0, 1, .... H–1}.

Figure 2A:
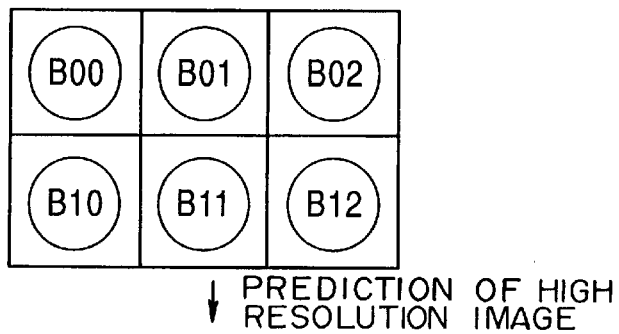
FIG. 2 is a schematic illustration of the process performed on a low resolution image in the coding apparatus shown in FIG. 1.
Figure 2B:
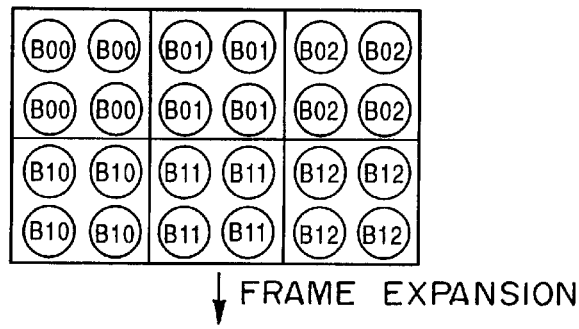

In this prediction method (filtering process), each pixel value of a low resolution image is duplicated at 2×2 neighboring locations and the resultant image is employed as the prediction of the high resolution image, as shown in FIGS. 2A and 2B.

Figure 3:
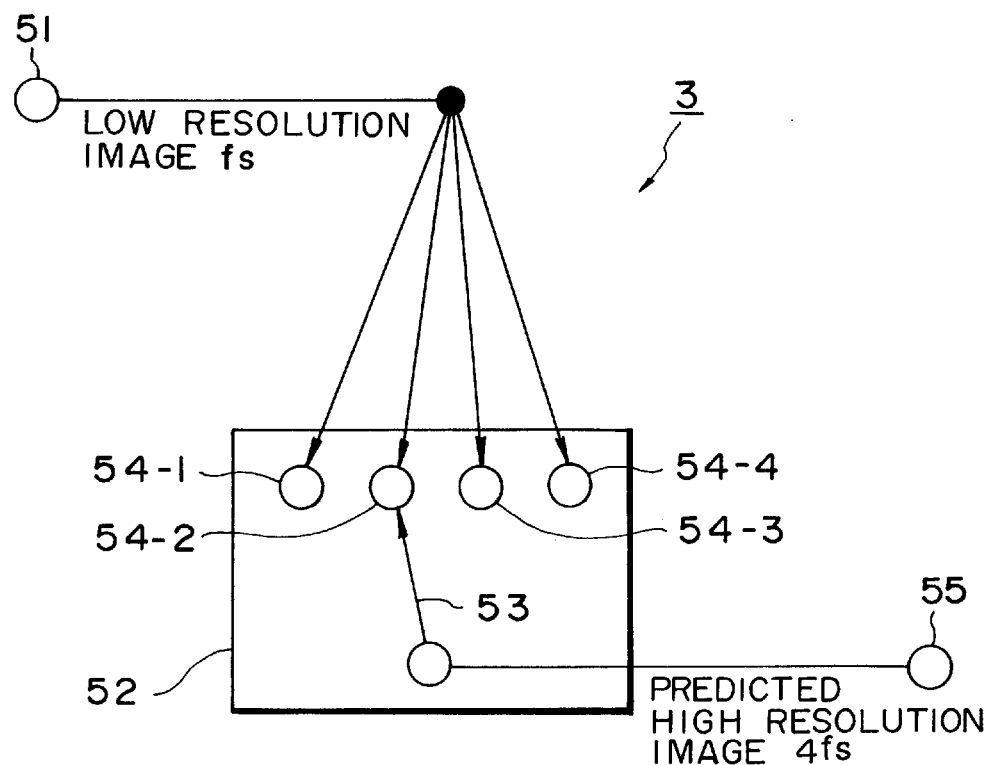
FIG. 3 is a schematic diagram illustrating an implementation of the high resolution image predictor shown in FIG. 1.

The filter (high resolution image predictor 3) for performing the process in accordance with equation (1) may be implemented for example as shown in FIG. 3. In the predictor 3 shown in FIG. 3, when a low resolution image is given via the low resolution image input terminal 51, each pixel value is stored in registers 54-1 to 54-4 of a selector 52. A switch 53 of the selector 52 sequentially selects the values stored in the registers 54-1 to 54-4 thereby predicting a high resolution image from the low resolution image. The predicted high resolution image is output via a predicted high resolution image output terminal 55.

Since the ratio of resolution of the output image to that of the input image is 2 in both vertical and horizontal directions, the output image includes 4 times as many pixels as the input image includes. Therefore, when the frequency of the low resolution image is fs, the frequency of the high resolution image becomes 4fs. The low resolution image received via the low resolution image input terminal 51 is stored in the four registers 54-1 to 54-4 of the selector 52, and these four registers 54-1 to 54-4 of the selector 52 are sequentially selected at a frequency 4 times the frequency of the input image thereby generating a predicted high resolution image. The predicted high resolution image is output via the predicted high resolution image output terminal 55.

The predicted high resolution image is output in such a manner that every two lines are mixed. The predicted high resolution image output via the predicted high resolution image output terminal 55 is processed by a pixel location converter (not shown) so that pixels in the two lines are rearranged at correct locations in the corresponding lines.

Although the high resolution image predictor 3 is implemented using the filter described above, the high resolution image predictor 3 may also be implemented using other prediction techniques.

Figure 2C:
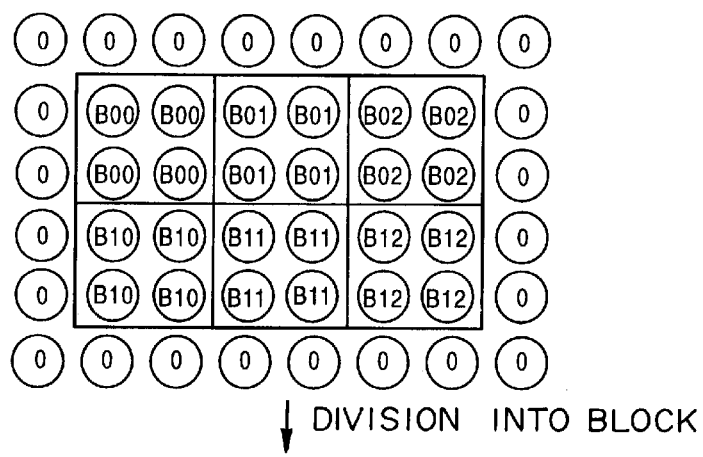

The frame expander 31 expands the frame size of the predicted image output from the high resolution image predictor 3 by adding pixels having a value of 0 (white) at the upper, lower, left, and right ends of the image thereby generating a predicted image in an expanded form. This expanding process corresponds to the conversion from FIG. 2C to FIG. 2B.

Figure 2D:
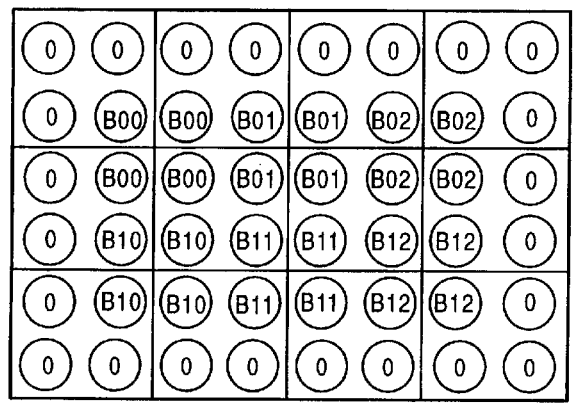

The block divider 32 divides the image (shown in FIG. 2C) output from the frame expander 31 into blocks each including 2×2 pixels as shown in FIG. 2D. As can be seen from the comparison between FIG. 2D and FIG. 2B, the division into blocks is performed in such a manner that each block includes four pixels originating from different pixels (at neighboring locations) in the original low resolution image. The expansion of the frame is necessary to make it possible to correctly divide the pixels located on the four sides of the image into blocks each including 2×2 pixels.

Figure 4:
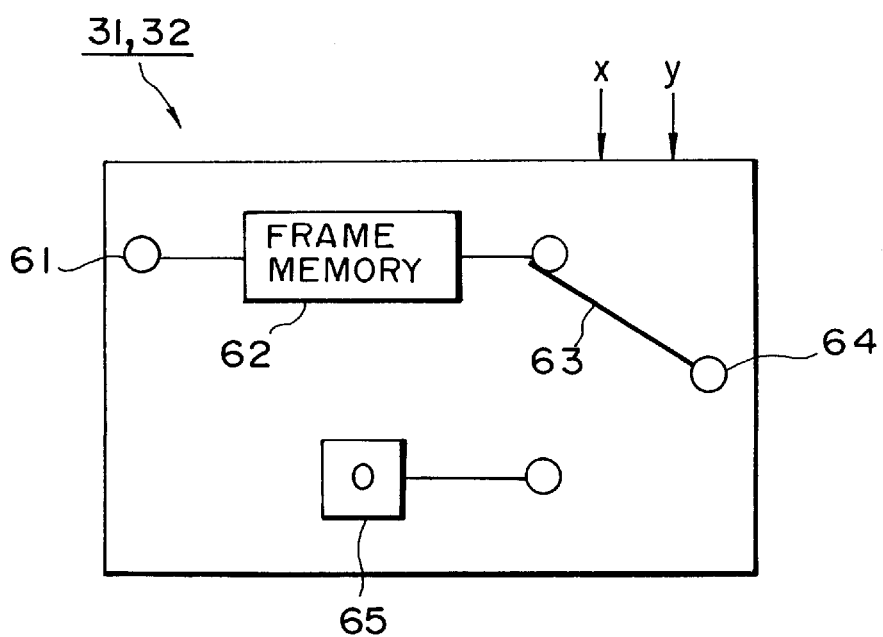
FIG. 4 is a schematic diagram illustrating an implementation of the frame expander and the block divider shown in FIG. 1.

The frame expander 31 and the block divider 32 may be constructed in a combined fashion as shown in FIG. 4. An image input via an image input terminal 61 is temporarily stored in a frame memory 62. In accordance with specified coordinates x, y, either 0 stored in a register 65 or a proper pixel of the image stored in the frame memory 62 is selected via a switch 63 and is output via an image output terminal 64.

Figure 5A:
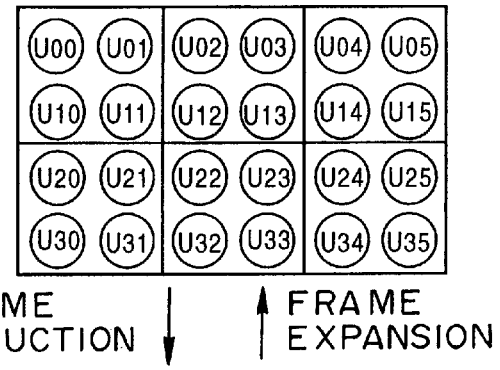
FIG. 5 is a schematic illustration of the process performed on a high resolution image in the coding apparatus shown in FIG. 1.
Figure 5B:
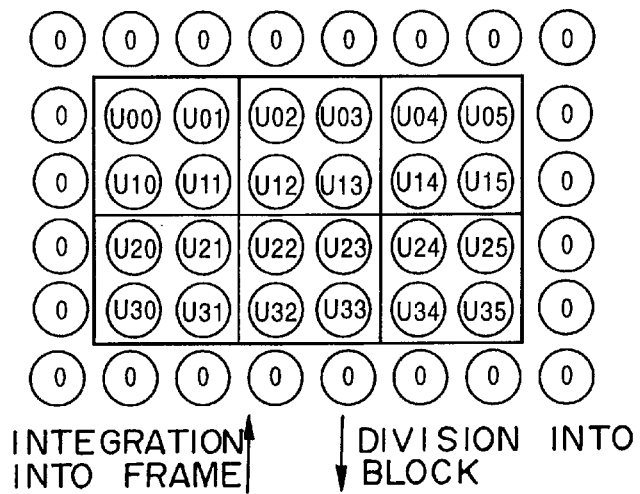
Figure 5C:
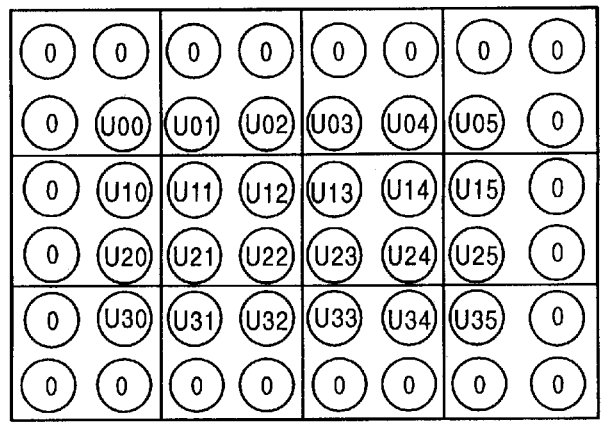

Similarly, the frame of the high resolution image input via the high resolution image input terminal 4 shown in FIG. 1 is expanded by the frame expander 35 and the resultant image is divided into blocks by the block divider 36, and thus the high resolution image shown in FIG. 5A is converted into the image shown in FIG. 5C via the image shown in FIG. 5B. The frame expander 35 and the block divider 36 can also be implemented in the same manner as shown in FIG. 4.

Figure 6:
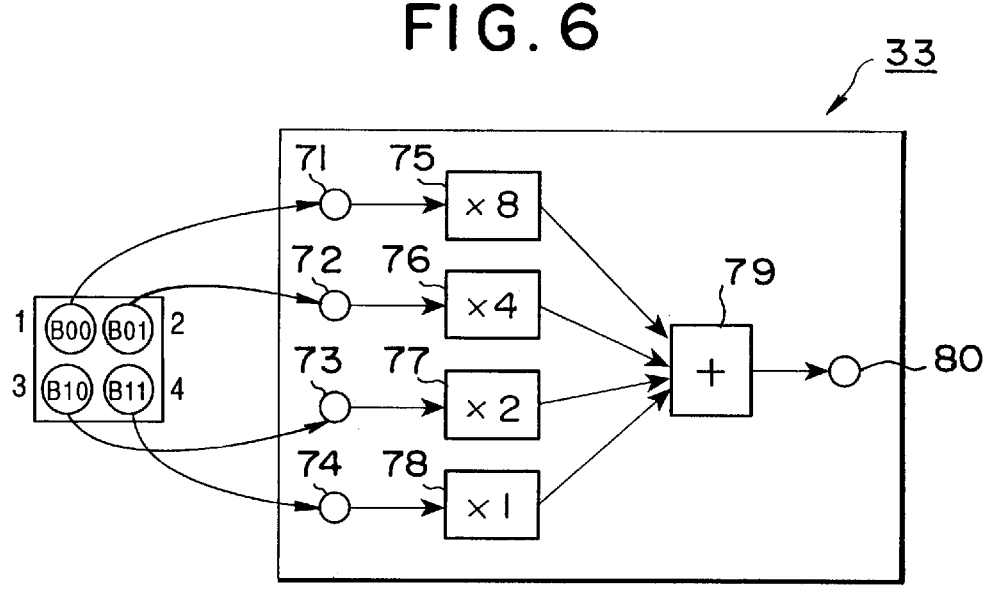
FIG. 6 is a schematic diagram illustrating an implementation of the type detector shown in FIG. 1.
Figure 7:
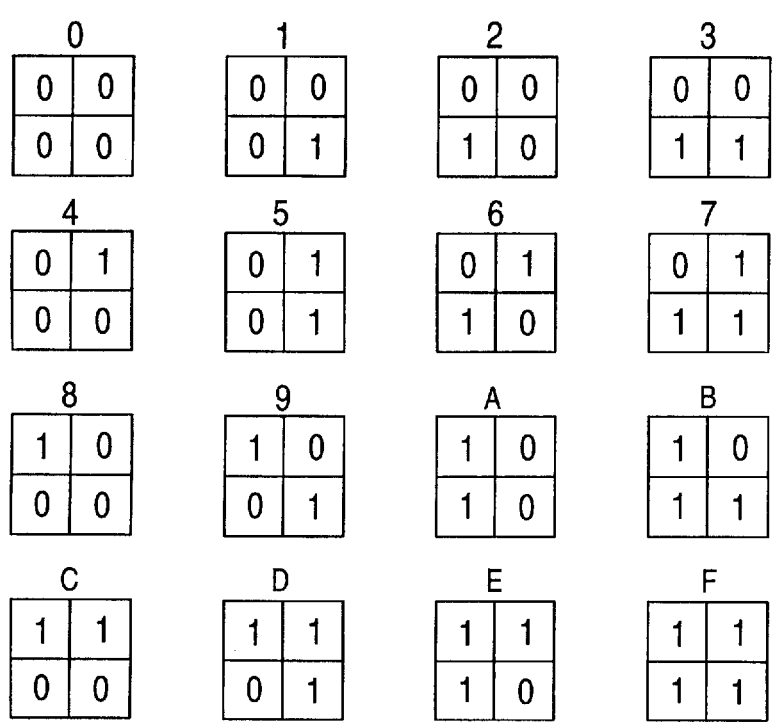
FIG. 7 is a schematic illustration of the operation of the type detector shown in FIG. 6.

The type detector 33 can be realized as shown in FIG. 6. As shown in FIG. 7, the type detector 33 calculates VLC_type which can take one of values in the range from 0 to 15 (0 to F in hexadecimal) for each set of four pixel values of the input low resolution image. That is, four bilevel pixel values B00, B01, B10, and B11 are input to input terminals 71–74, respectively. The multipliers 75–78 multiply the bilevel pixel values (1 or 0) received via the corresponding input terminals 71–74 by a factor of 8, 4, 2, or 1. An adder 79 calculates the sum of the outputs of the multipliers 75–78 and outputs the result via an output terminal 80. Thus, VLC_type output via the VLC_type output terminal 80 has a value which represents four bilevel pixel values (B00, B01, B10, and B11) in decimal (or hexadecimal) form. In other words, the above process is performed simply by reading a series of four bilevel pixel values (B00, B01, B10, B11) as a binary number. Therefore, if the four bilevel pixel values are regarded as being transmitted via a four-line data bus, then no operation is required.

Referring back to FIG. 1, the exclusive-OR gate 34 calculates the difference between each block of the high resolution image output by the block divider 36 and the corresponding block of the predicted image output by the block divider 32 thereby generating a difference block signal. Since the difference is calculated for bilevel images, the operation can be performed not using a subtractor but an exclusive-OR gate.

The VLC coder 37 performs VLC-coding on each block of the difference image produced by the exclusive-OR gate 34 using a VLC table. The VLC table is selected in accordance with VLC_type determined by the type detector 33 from the corresponding block of the predicted image.

Figure 8:
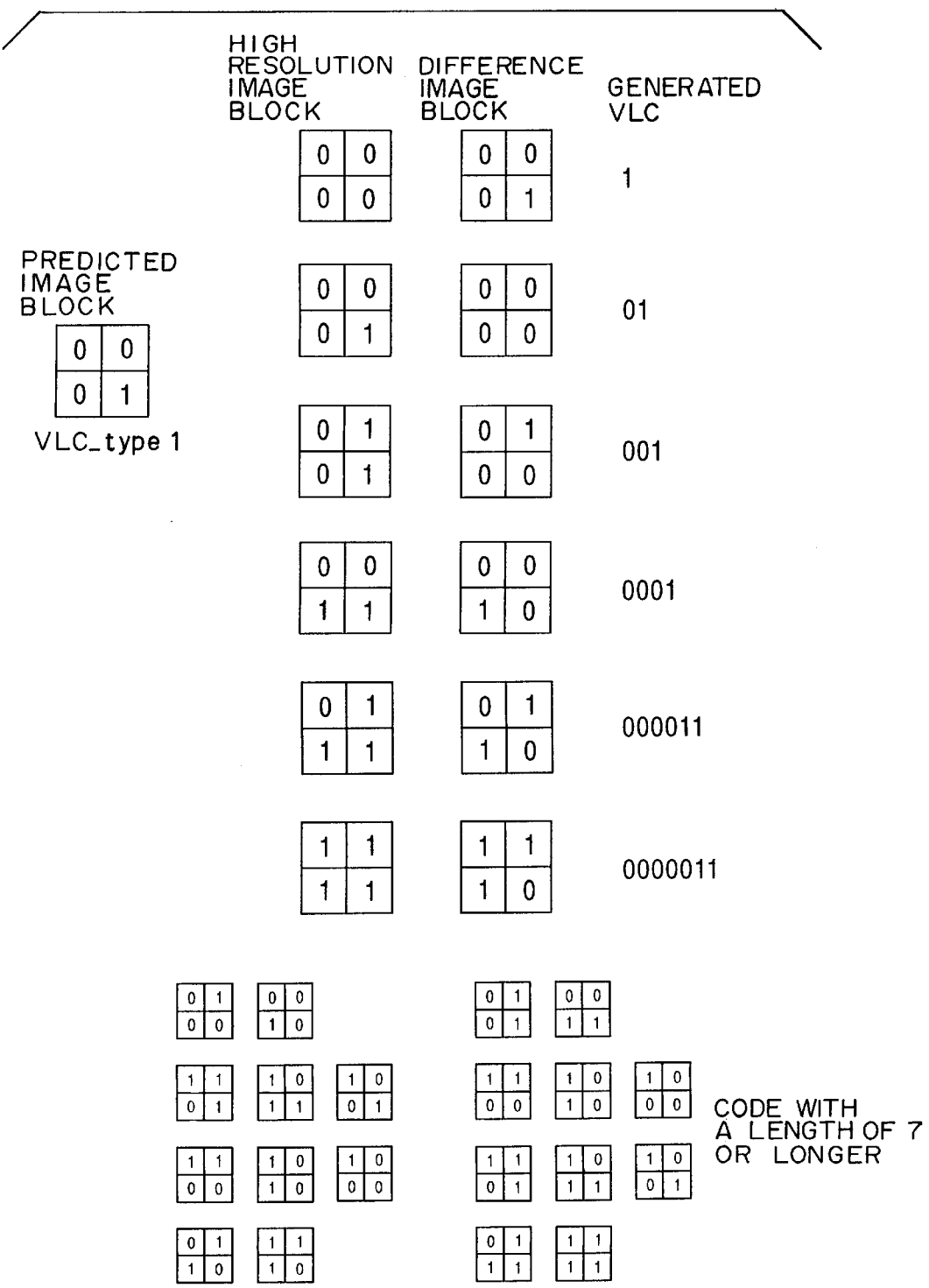
FIG. 8 illustrates an example of a VLC table stored in the VLC coder shown in FIG. 1.
Figure 9:
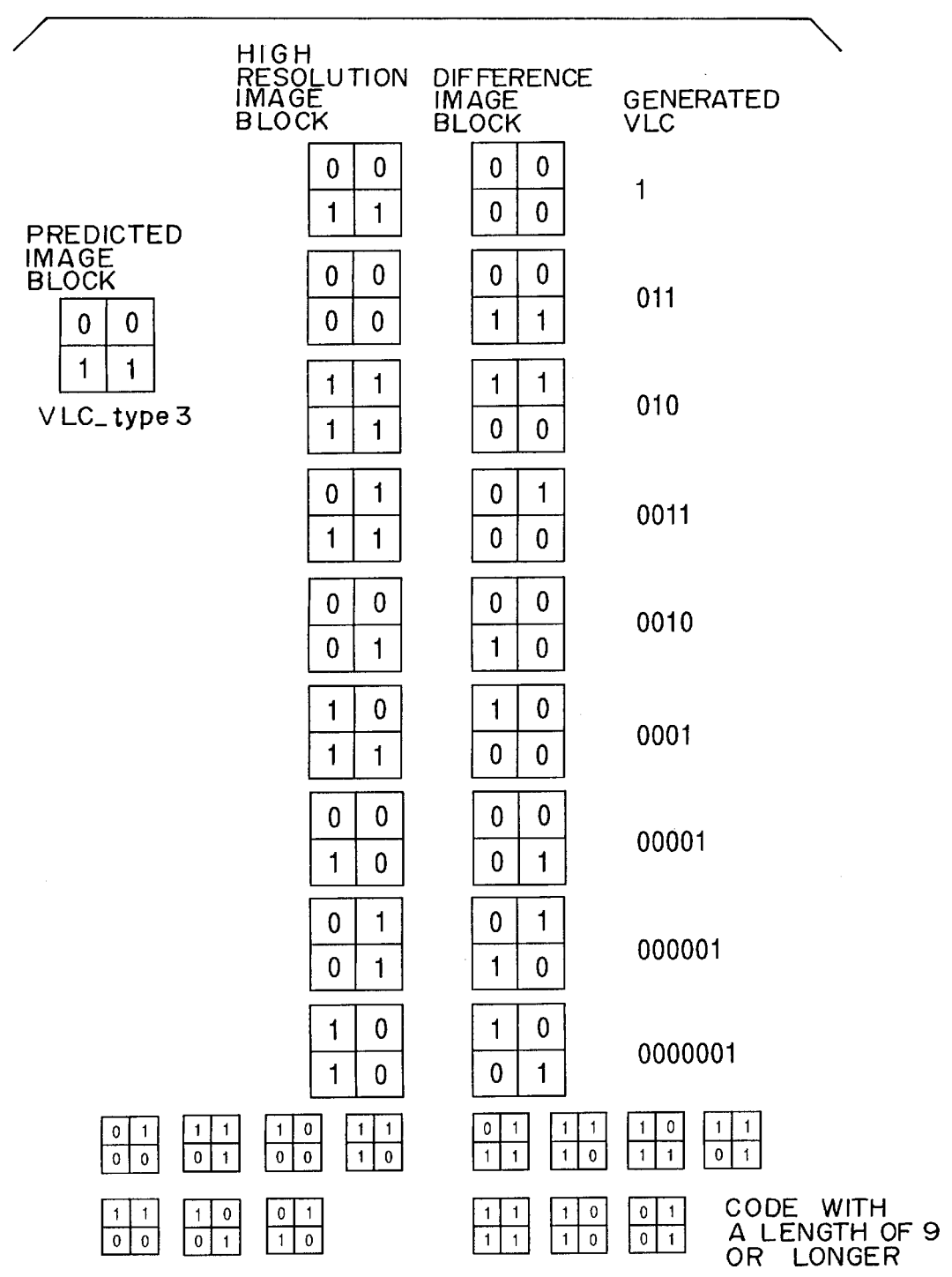

FIGS. 8 and 9 illustrate examples of VLC tables. The VLC table shown in FIG. 8 is used when VLC_type of a block of a predicted image is 1, while the VLC table shown in FIG. 9 is used when VLC_type is 3. The VLC coder 37 includes sixteen VLC tables corresponding to the respective VLC_types including VLC_type0 to VLC_typeF.

The VLCs (variable length codes) in the respective VLC tables are determined so that a shorter VLC is given to a more frequently occurring block of the difference image. For example, as shown in FIG. 8, when a predicted image block is of VLC_type1, the most frequently occurring pattern of the difference image block corresponding to this predicted image block is the pattern represented at the top of FIG. 8. This pattern can be expressed by (0001) if the four bilevel values of the block elements are taken from left to right and up to down. The frequency of occurrence can be determined experimentally. Thus, the block of the difference image having a pattern of (0001) is given "1" which is the shortest VLC. The pattern of the difference image which next most frequently occur is (0000), and therefore the block of the difference image having a pattern of (0000) is given "01" which is the next shortest VLC.

Similarly, VLCs are assigned to all possible patterns of the block of the difference image in such a manner that a block pattern which occurs more frequently has a shorter VLC. Assignment of VLCs is performed in a similar manner in all VLC tables, not only in the VLC table shown in FIG. 9 applied to the predicted image block of VLC_type3 but also in other VLC tables applied to the predicted image block of other VLC_types.

Thus, VLC coder 37 performs VLC-coding operation in the most efficient fashion.

The difference image coded data output from the VLC coder 37 is supplied to the multiplexer 7, and multiplexed with the low resolution image coded data supplied from the low resolution image coder 2. The resultant signal is then output via the high/low resolution image coded data output terminal 8, and stored on a disk 20 or transmitted elsewhere via a proper transmission line. Therefore, as can be seen from the above description, the bit stream data, which is stored on a disk 20 or transmitted via a proper transmission line 21, consists of difference image data which is coded with variable length codes in accordance with the pattern of each 2×2 block of the predicted image.

In the present embodiment, as described above, the bilevel difference image is coded in a highly efficient manner using a VLC table selected in accordance with the each block pattern of the predicted image. As a whole, the coding apparatus of the present embodiment can perform spatially hierarchy coding on a bilevel image in a highly efficient manner.

As described above, the selection of the VLC table is performed in accordance with the locally decoded data of the low resolution image. Therefore, if, in a decoding apparatus which will be described later, a predicted image is produced from image data obtained by decoding a low resolution image, then it is not necessary to send the VLC table selection information to the decoding apparatus. In this respect, the present invention offers a high-efficiency coding method.

Figure 10:
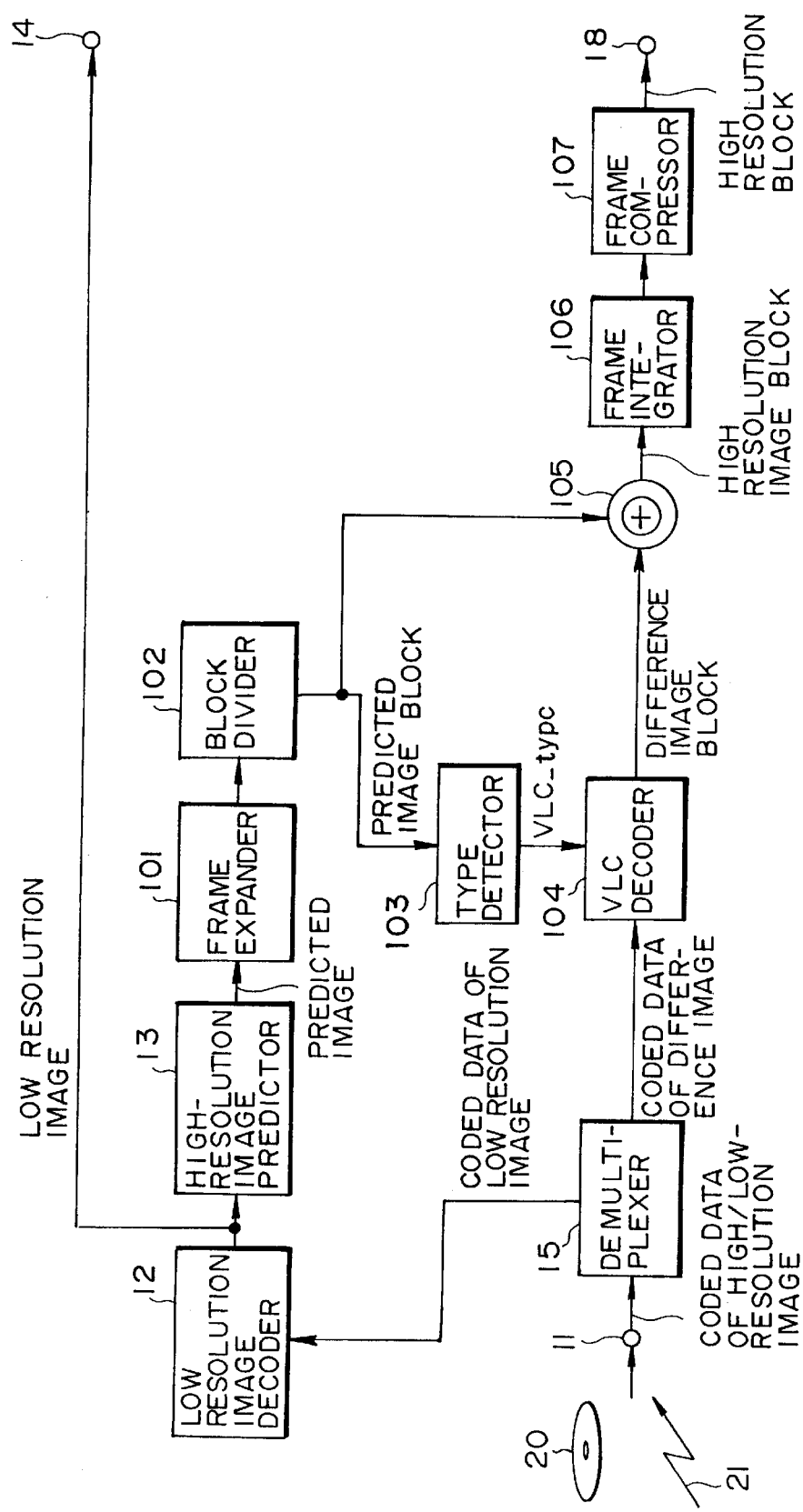
FIG. 10 is a block diagram illustrating a decoding apparatus corresponding to the coding apparatus shown in FIG. 1.

FIG. 10 illustrates a decoding apparatus for decoding an input signal consisting of multiplexed data representing a bilevel low resolution image and data representing the difference between a bilevel high resolution image and an image predicted from the low resolution image.

Figure 25:
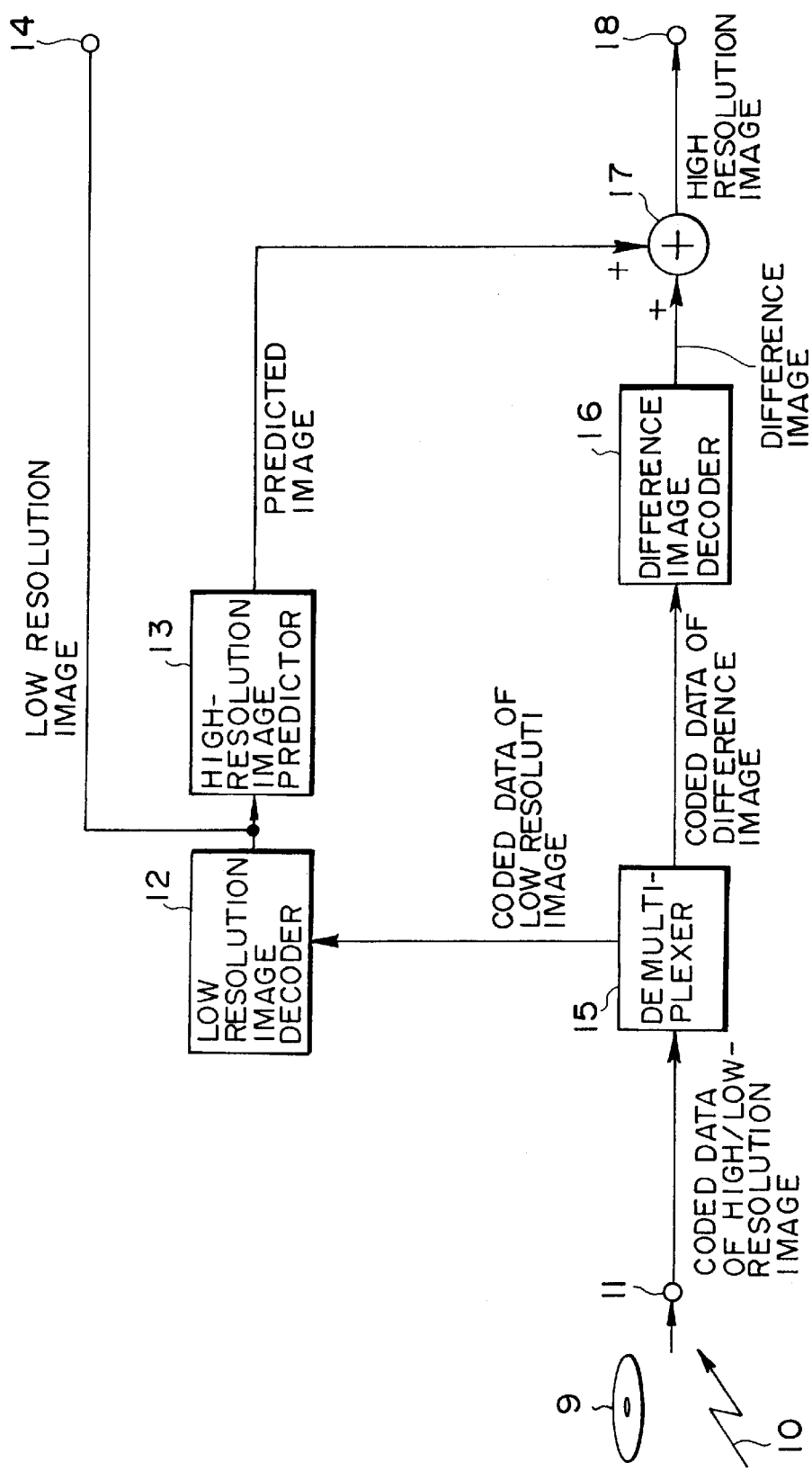
FIG. 25 is a block diagram illustrating a conventional decoding apparatus.
Figure 26:
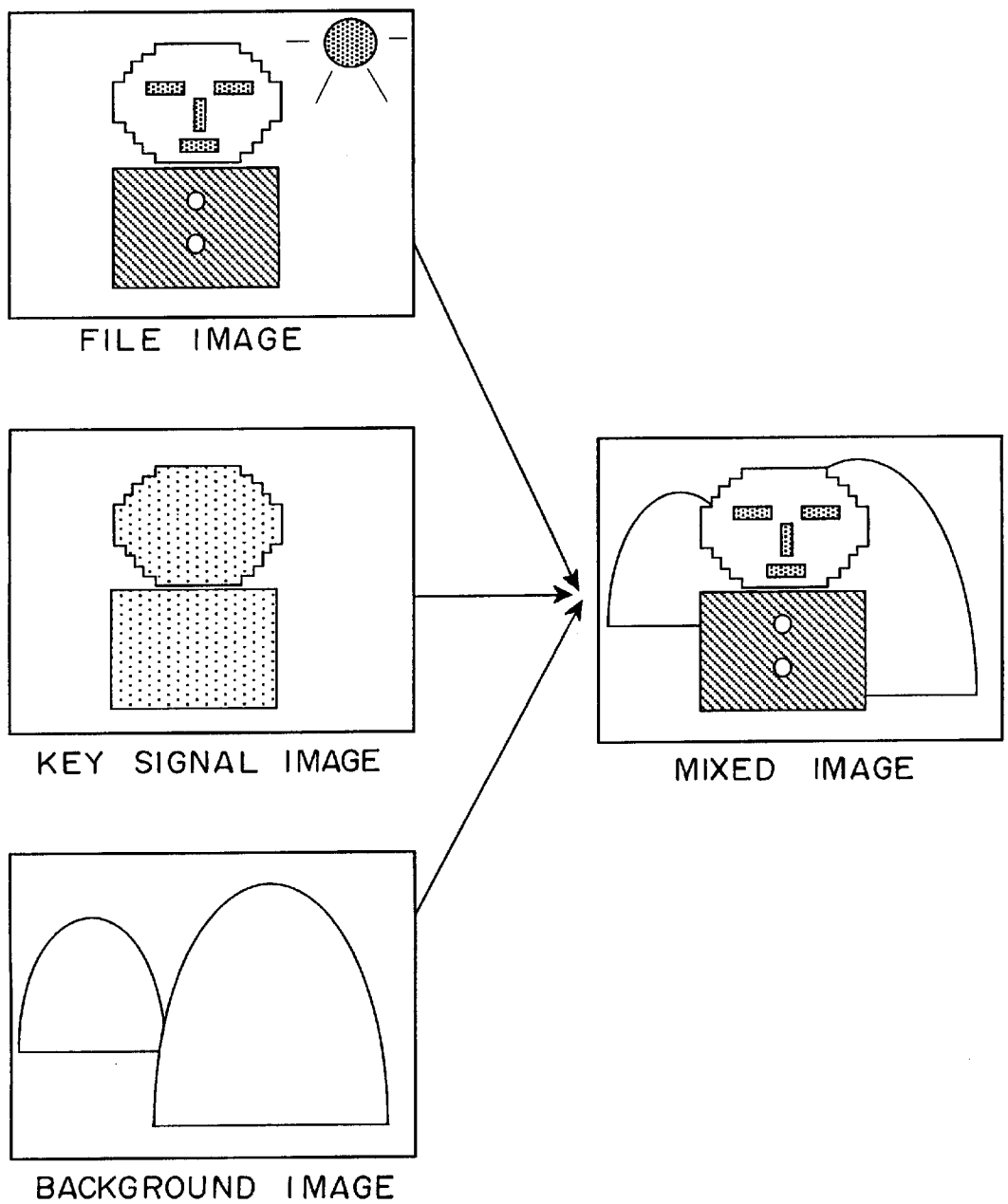
FIG. 26 is a schematic representation of a key signal.

As opposed to the decoding apparatus shown in FIG. 25, this decoding apparatus performs the decoding operation in a different manner as described below. That is, an image is predicted from a decoded image, and converted in format by a frame expander 101 and a block divider 102. A type detector 103 detects the type of the signal output from the block divider 102 and generates a corresponding VLC_type signal. A VLC decoder 104 decodes the VLC-coded difference image data with reference to a VLC table selected in accordance with the detected VLC-type thereby generating a block of a difference image. Furthermore, an exclusive-OR gate 105 generates a block of a high resolution image, which is then converted in format by a frame integrator 106 and a frame compressor 107. The other parts of the decoding apparatus are constructed in a similar manner to those of the decoding apparatus shown in FIG. 25, and therefore those similar parts are denoted by similar reference numerals and the duplicated description thereof is not given here.

The operation of the decoder of the present embodiment is described in further detail below.

A bit stream (high/low resolution coded data) reproduced from a disk 20 or supplied via a transmission line 21 is applied to a demultiplexer 15 via a high/low resolution coded data input terminal 11. The demultiplexer 15 separates the received high/low resolution coded data into difference image coded data and low resolution image coded data. The difference image coded data is supplied to a frame expander 108, while the low resolution image coded data is supplied to a low resolution image decoder 12.

The low resolution image decoder 12 performs a decoding operation which corresponds to the coding operation performed by the low resolution image coder 2 of the coding apparatus shown in FIG. 1 thereby decoding the low resolution image coded data. The obtained low resolution image is output via a low resolution image output terminal 14. The high resolution image predictor 13 generates a predicted image from the low resolution image supplied from the low resolution image decoder 12. The resultant predicted image is applied to the frame expander 101 and the frame of the image is expanded. The expanded image is then applied to the block divider 102 and divided into blocks. Each block of the predicted image output from the block divider 102 is applied to the type detector 103. The type detector 103 detects the type of the block of the predicted image and generates a corresponding VLC_type signal.

The above-described processes performed by the high resolution image predictor 13, the frame expander 101, the block divider 102, and the type detector 103 are basically the same as those performed by the high resolution image predictor 3, the frame expander 31, the block divider 32, and the type detector 33 in the first embodiment.

The VLC decoder 104 includes VLC tables (decoding tables) such as those shown in FIGS. 8 and 9, and decodes the VLC-coded difference image coded data supplied from the demultiplexer 15 into a block of difference image using a VLC table selected in accordance with the VLC_type which is calculated from the block of the predicted image by the type detector 103.

The exclusive-OR gate 105 calculates the exclusive-OR between the block of the difference image and the block of the predicted image thereby generating a block of the high resolution image. Also in this case, since the data is in the bilevel form, the operation is performed not by an adder but the exclusive-OR gate.

The frame integrator 106 combines the blocks of high resolution image generated by the exclusive-OR gate 105 into a single frame. This process corresponds to the conversion from the data in the form shown in FIG. 5C to the data in the form shown in FIG. 5B.

The frame compressor 107 reduces the frame size by an amount of one pixel at its upper, lower, left, and right ends for the image output from the frame integrator 106 thereby converting the data in the form shown in FIG. 5B to the data in the form shown in FIG. 5A. The pixels which are removed in this process all have a value of 0.

Figure 11:
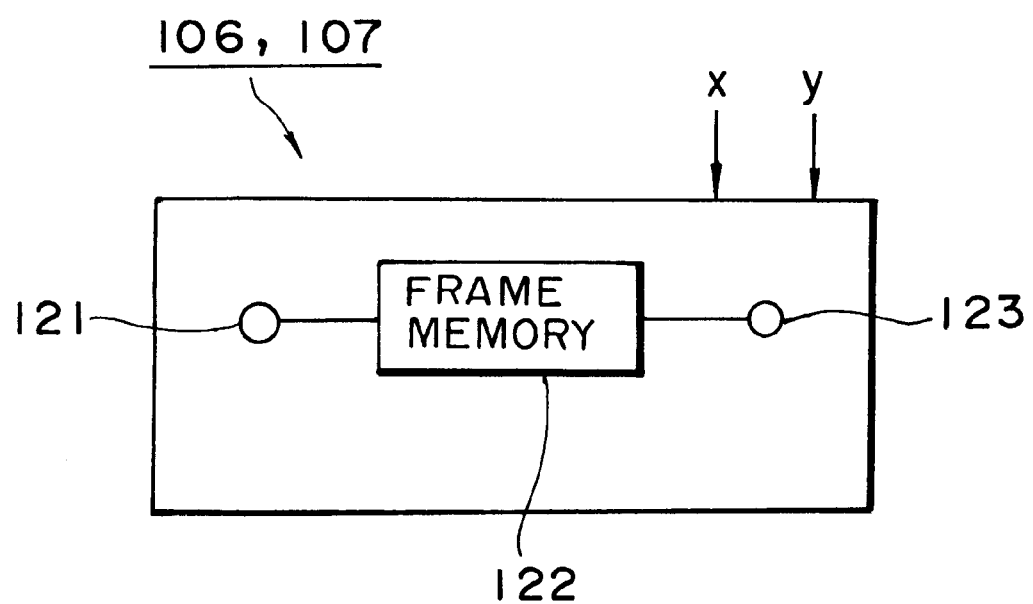
FIG. 11 is a block diagram illustrating an implementation of the frame integrator and the frame compressor used in the decoding apparatus shown in FIG. 10.

The frame integrator 106 and the frame compressor 107 can be implemented in a combined fashion as shown in FIG. 11. In FIG. 11, an image input via an image input terminal 121 is temporarily stored in a frame memory 122. In accordance with a specified coordinates x, y, a proper pixel is read out from the frame memory 122, and output via an image output terminal 123.

In the present embodiment, as described above, the bilevel difference image is decoded using a VLC table selected in accordance with each block value of the predicted image. As a whole, the decoding apparatus of the present embodiment can correctly perform spatially hierarchy decoding on a bilevel image.

Figure 12:
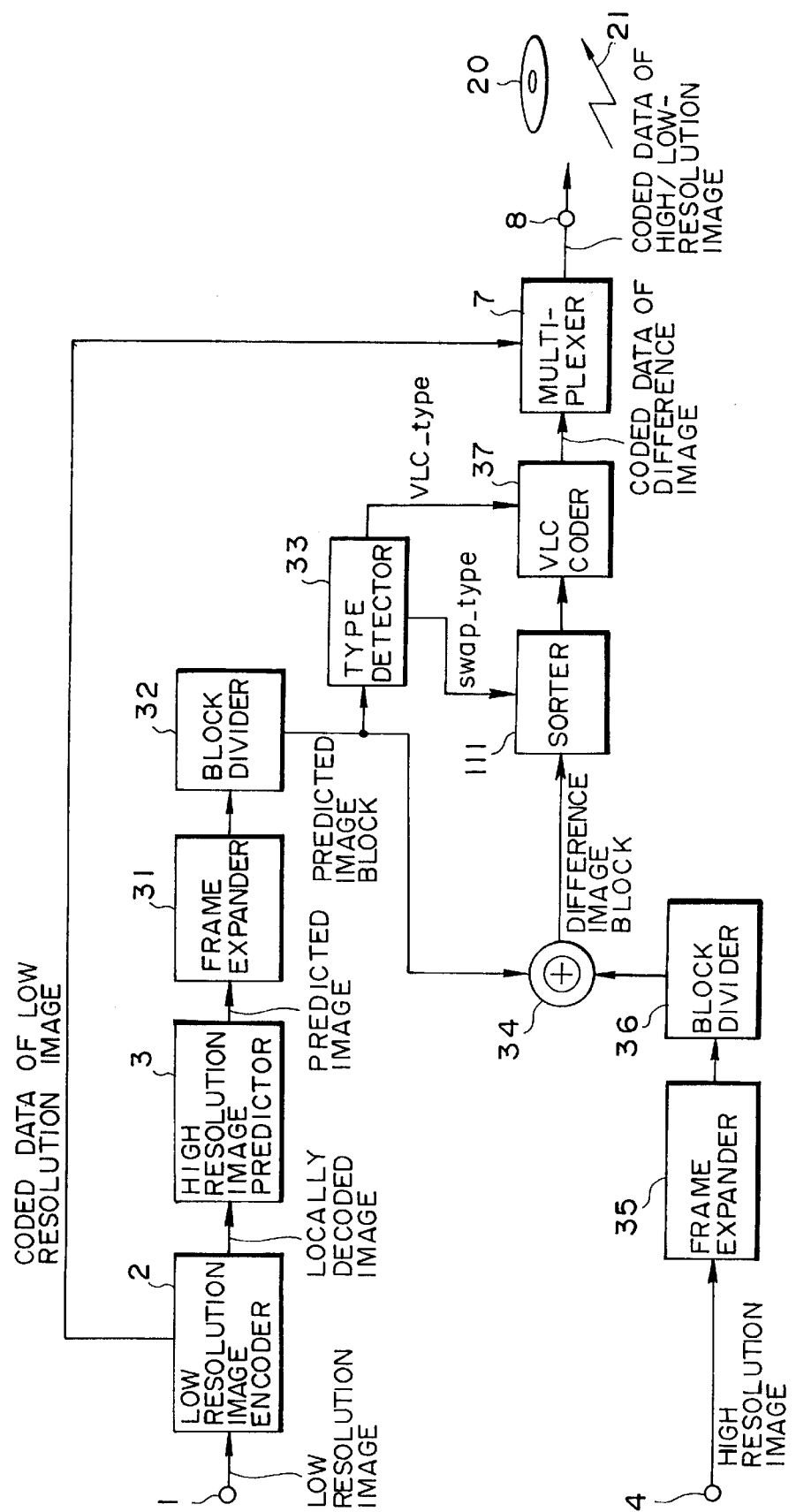
FIG. 12 is a block diagram illustrating another embodiment of a coding apparatus according to the invention.

FIG. 12 illustrates a second embodiment of a coding apparatus according to the invention. In this embodiment, in addition to the construction according to the first embodiment described above, the coding apparatus further includes a pixel position exchanger 111 for rearranging the pixel locations in each block of the high resolution image. This allows the coding tables to be simplified compared to those employed in the first embodiment.

The coding apparatus of the present embodiment differs from that of the first embodiment shown in FIG. 1 in that a type detector 33 calculates not only VLC_type but also swap_type for use by the pixel position exchanger 111. The other parts are similar to those employed in the coding apparatus shown in FIG. 1, and therefore those similar parts are denoted by similar reference numerals and they are not described here in further detail.

Figure 13:
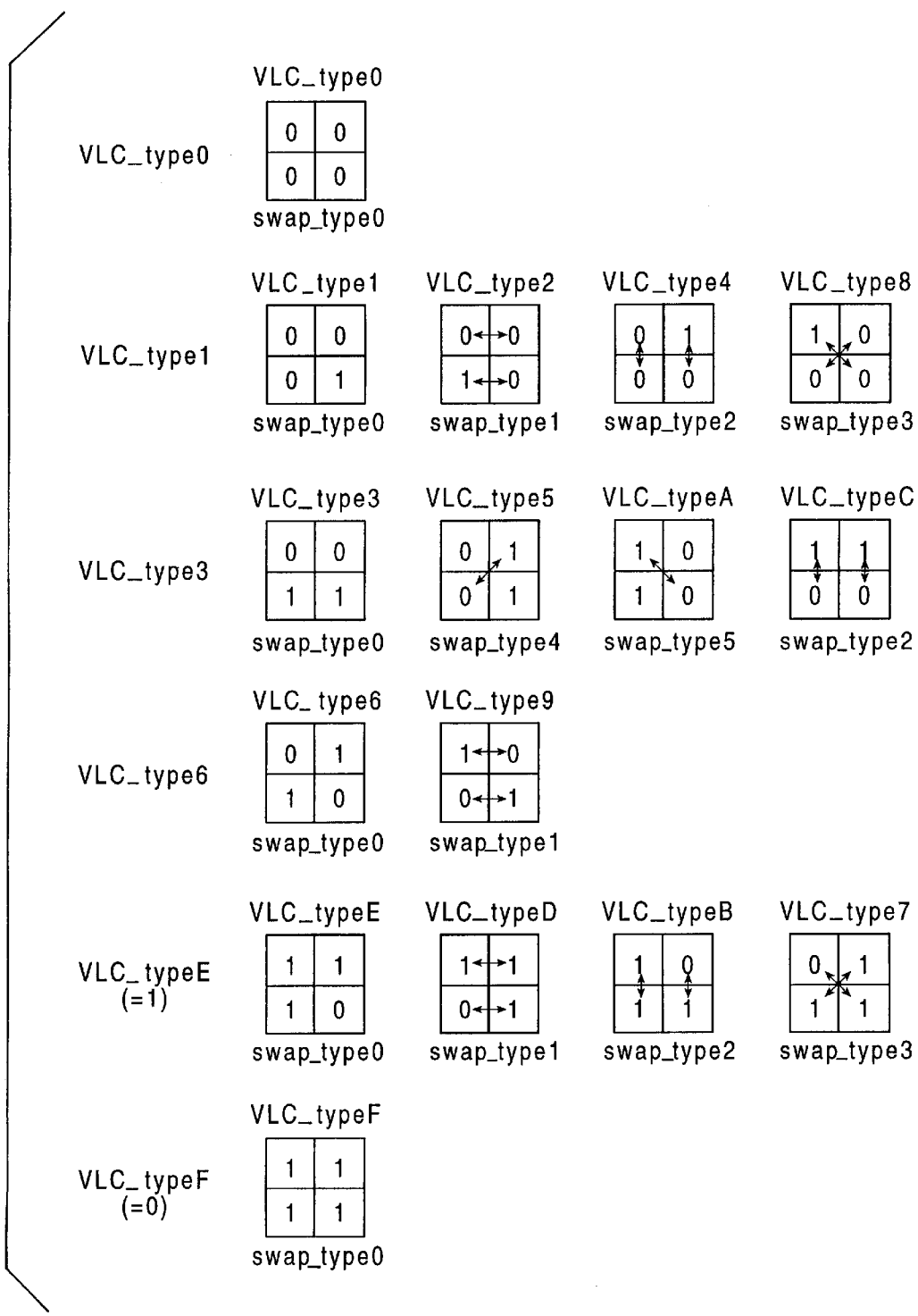
FIG. 13 is a schematic illustration of the operation of the type detector shown in FIG. 12.

FIG. 13 illustrates examples of VLC_type and swap_type calculated by the type detector 33. Although there are sixteen patterns which can be taken by the block consisting of 2×2 pixels of the predicted image, the same VLC table can be used for those patterns which can be regarded as the same pattern when an exchange is performed between upper and lower elements, between left and right elements, or between oblique elements. That is, as shown in FIG. 13, sixteen different VLC types of VLC_type0 to VLC_typeF can be grouped into six types including VLC_type0, VLC_type1, VLC_type3, VLC_type6, VLC_typeE, and VLC_typeF. Thus, only six VLC tables are sufficient for the present purpose.

For example, VLC_type2 has 0s at the left and right in the upper row, 1 at the left in the lower row and 1 at the right in the lower row. Therefore, if exchange (swap_type1 exchange) is performed between the elements at right and the element at left for VLC_type2, then the result becomes the same as the VLC_type1 pattern. On the other hand, VLC_type4 has 0 at the top left, 1 at the top right, 0 at the bottom left, and 0 at the bottom right, and therefore exchange between upper and bottom elements (swap_type2 exchange) produces the same pattern as the VLC_type1 pattern. VLC_type8 has 1 at the top left, 0 at the top right, 0 at the bottom left, and 0 at the bottom right, and therefore if the element at the top left and the element at the bottom right are exchanged and furthermore the element at the top right and the element at the bottom left are exchanged (swap_type3 exchange), then the result becomes the same as the VLC_type1 pattern. Thus, the VLC_type2, VLC_type4, and VLC_type8 patterns can be regarded as equivalent to the VLC_type1 pattern, and it is possible to employ the VLC_type1 pattern as a representative.

The swap_type refers to an exchange operation by which a certain VLC_type pattern can be converted to an equivalent pattern which is the representative of a pattern group. VLC_type indicates which VLC table should be employed in the VLC coding operation.

The type detector 33 having the capability described above can be implemented as shown in FIG. 14. The type detector 33 determines swap_type and VLC_type for each block of the input low resolution image by referring to two tables 121 and 122 which describe the relationships between the value of 0 to F calculated from the four pixel values of the block and swap_type and VLC_type. VLC_type is determined by referring to the VLC_type table 121, and swap_type is determined by referring to the swap_type table 122.

Figure 14:
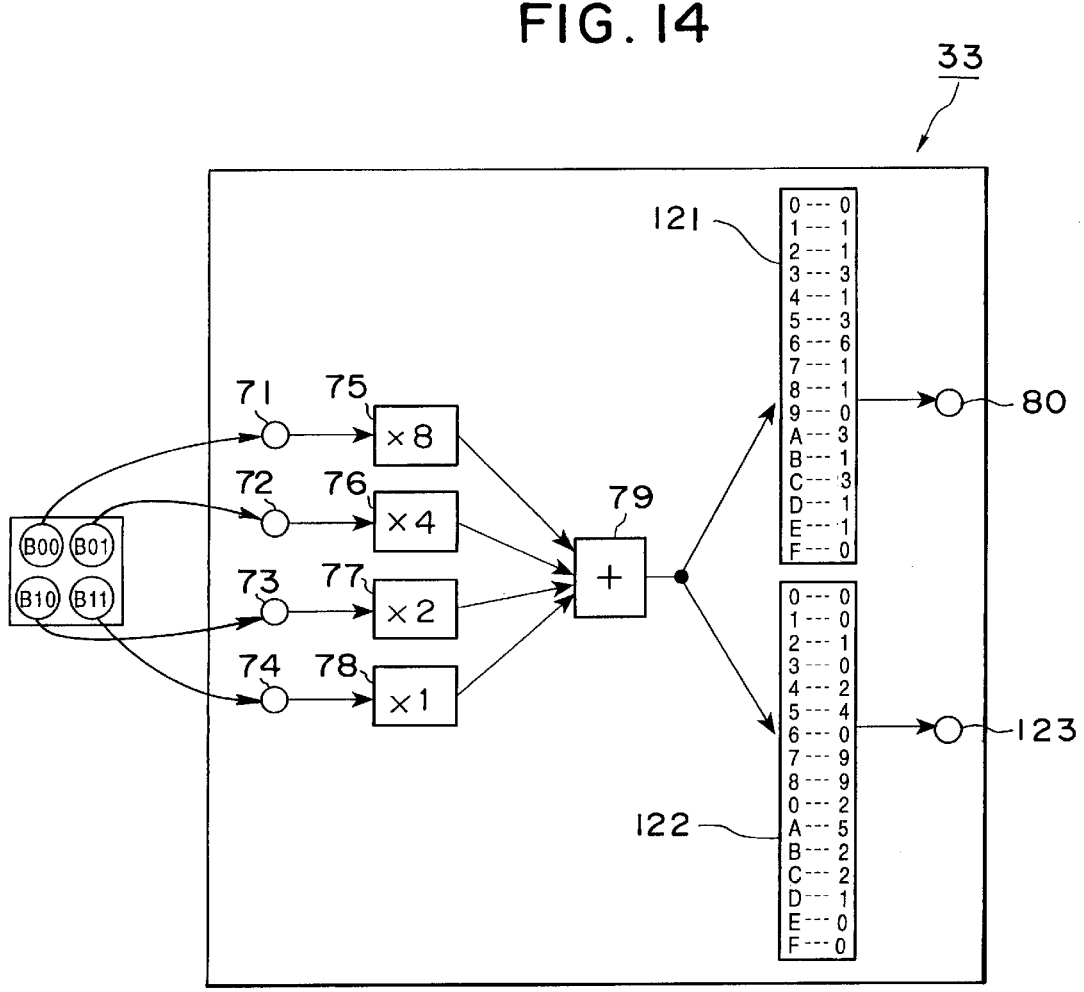
FIG. 14 is a schematic diagram illustrating an implementation of the type detector shown in FIG. 12.

In this type detector 33 shown in FIG. 14, the part from the input terminals 71 to the adder 79 is constructed in the same manner as the corresponding part of the type detector 33 shown in FIG. 6. As described above with reference to FIG. 6, the output of the adder 70 has a value (VLC_type) in the range of 0 to F. The VLC_type table 121 serves as a conversion table for grouping the 16 VLC_types into 6 VLC_types. That is, proper one of six VLC_types is selected via the VLC_type table 121 and is output via a VLC_type output terminal 80.

On the other hand, the swap_type table 122 serves as a conversion table used to convert an input VLC_type to a corresponding swap_type. That is, swap_type corresponding to VLC_type is selected by the swap_type table 122 and selected swap_type is output via a swap_type output terminal 123.

Figure 15:
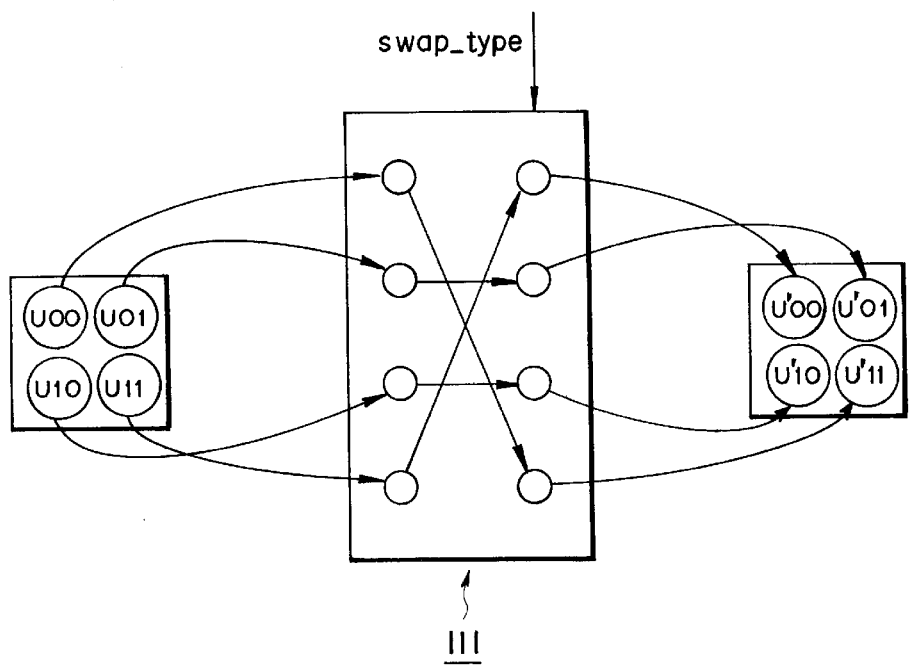
FIG. 15 is a block diagram illustrating an implementation of the pixel position exchanger shown in FIG. 12.
Figure 16:
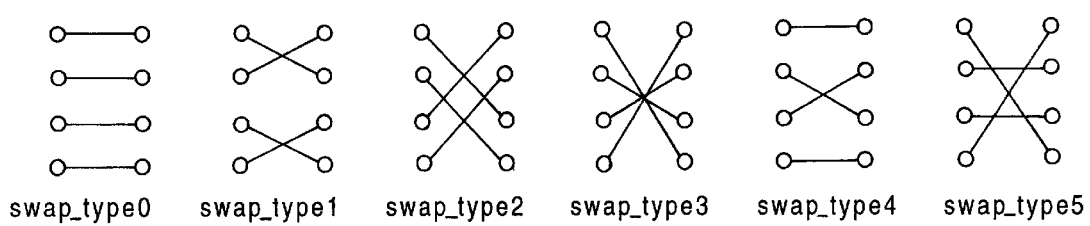
FIG. 16 is a schematic diagram illustrating the switching operation of the pixel position exchanger shown in FIG. 15.

Referring again to FIG. 12, the pixel position exchanger 111 rearranges the pixel elements in the difference image block in the manner specified by swap_type. The pixel position exchanger 111 can be realized as shown in FIG. 15. In FIG. 15, internal switches are provided in the pixel position exchanger 111 and these internal switches are switched in accordance with swap_type as shown in FIG. 16 so that a corresponding exchange operation selected from swap_type0 to swap_type5 is performed.

In the coding apparatus of the present embodiment, as described above, the pixel elements in each bock to be coded are rearranged by the pixel position exchanger 111 shown in FIG. 12 so that the coding can be performed using a smaller number of VLC tables than required in the embodiment shown in FIG. 1.

In this coding apparatus, the manner of rearrangement is determined in accordance with the image decoded from the low resolution image. Therefore, the manner of rearrangement required in a decoding apparatus can also be determined in accordance with an image decoded from a low resolution image. This means that it is not necessarily required to transmit the rearrangement information from the coding apparatus to the decoding apparatus. Also in this respect, the coding operation is performed by the coding apparatus of the present embodiment in a highly efficient manner.

Figure 17:
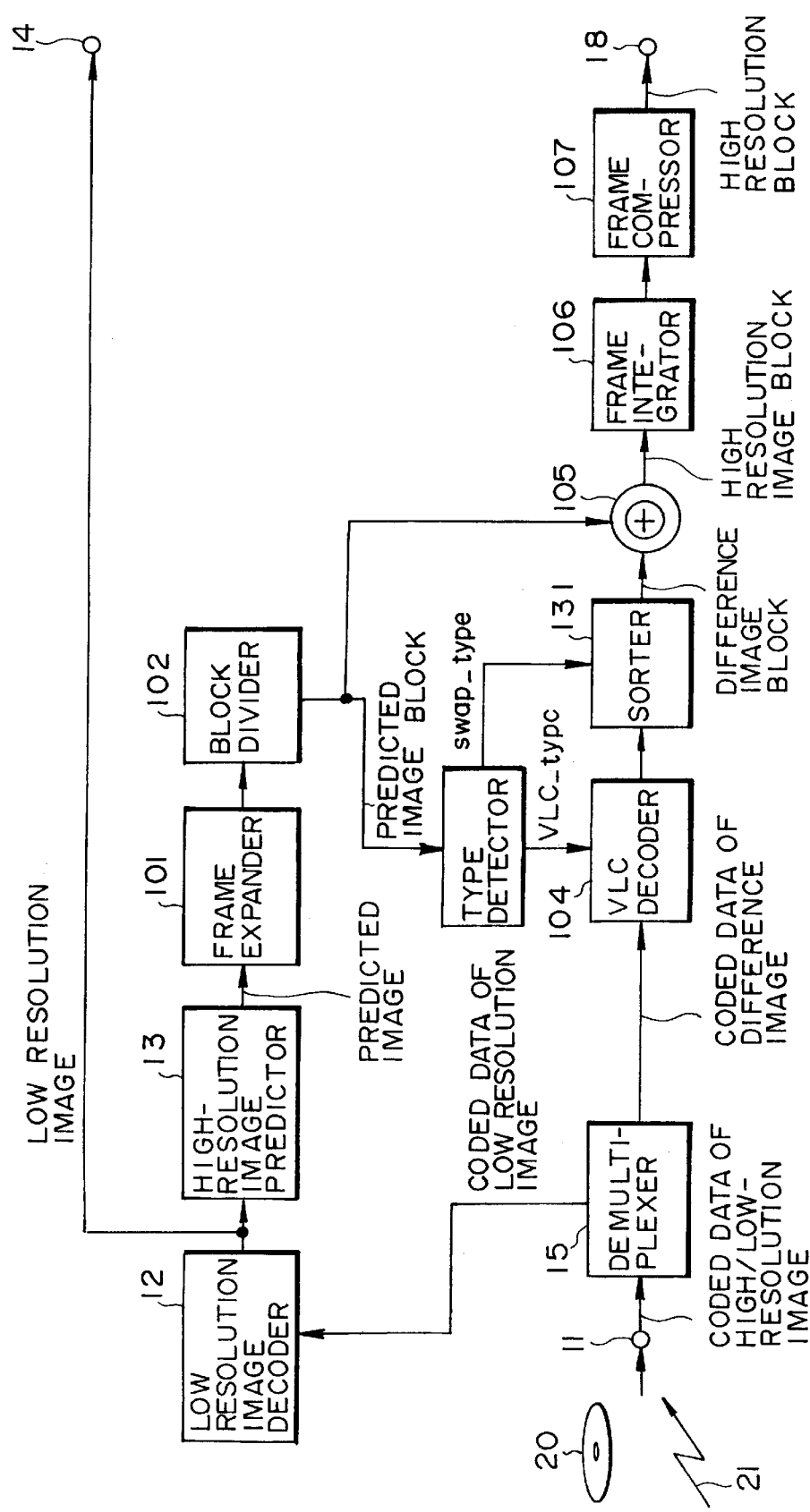
FIG. 17 is a block diagram illustrating a decoding apparatus corresponding to the coding apparatus shown in FIG. 12.

FIG. 17 illustrates a decoding apparatus corresponding to the coding apparatus shown in FIG. 12. As in the coding apparatus shown in FIG. 12, the decoding apparatus has a pixel position exchanger 131 for rearranging the pixel elements in each block of a decoded difference image. This makes it possible to use simpler coding tables (decoding tables) than required in the technique described above with reference to FIG. 10.

The decoding apparatus of this embodiment differs from that shown in FIG. 10 in that the type detector 103 determines not only the VLC_type but also the swap_type, and in that the pixel position exchanger 131 performs rearrangement in accordance with the determined swap_type.

The other parts are similar to those employed in the decoding apparatus shown in FIG. 10. These similar parts are denoted by similar reference numerals, and they are not described in further detail here.

The type detector 103 calculates the VLC_type and swap_type in the same manner as the type detector 33 shown in FIG. 12. The pixel position exchanger 131 rearranges the pixel elements in each block of a decoded difference image in accordance with the swap_type. In other respects, the operation is performed in the same manner as in the decoding apparatus shown in FIG. 10.

In the present embodiment, as described above, since the pixel elements in each decoded block are rearranged, a smaller number of VLC tables are required in operation than required in the embodiments described above with reference to FIGS. 1 and 10. The information required to determine the manner of rearrangement is obtained from the decoded low resolution image which is the same as that employed in the coding apparatus. Thus, although a less number of VLC tables are used than used in the apparatus shown in FIGS. 1 and 10, it is possible to correctly perform decoding operation.

In the coding apparatus shown in FIG. 12 and also in the decoding apparatus shown in FIG. 17, the number of VLC_types is reduced from 16 to 6. If the bilevel values are inverted between 1 and 0, the number of VLC_types can be further reduced to 4. That is, in FIG. 13, if the pixels values of the respective VLC_types in the group of VLC_typeE are inverted between 1 and 0, then the resultant patterns become the same as those in the group of VLC_type1. Therefore, the VLC_typeE can be combined with the VLC_type1 into a single group.

Similarly, if inversion is performed for the VLC_type patterns in the group of VCL_typeF, the resultant patterns become the same as those in the group of VLC_type0. Therefore, the VLC_typeF can be combined with the VLC_type0 into a single group.

In the above embodiments, the coding and decoding are performed for a pair of high resolution image and low resolution image block by block. Instead, the coding and decoding may also be performed for a high resolution moving image and a low resolution moving image frame by frame. Furthermore, the same technique may also be applied to a still image.

Figure 18:
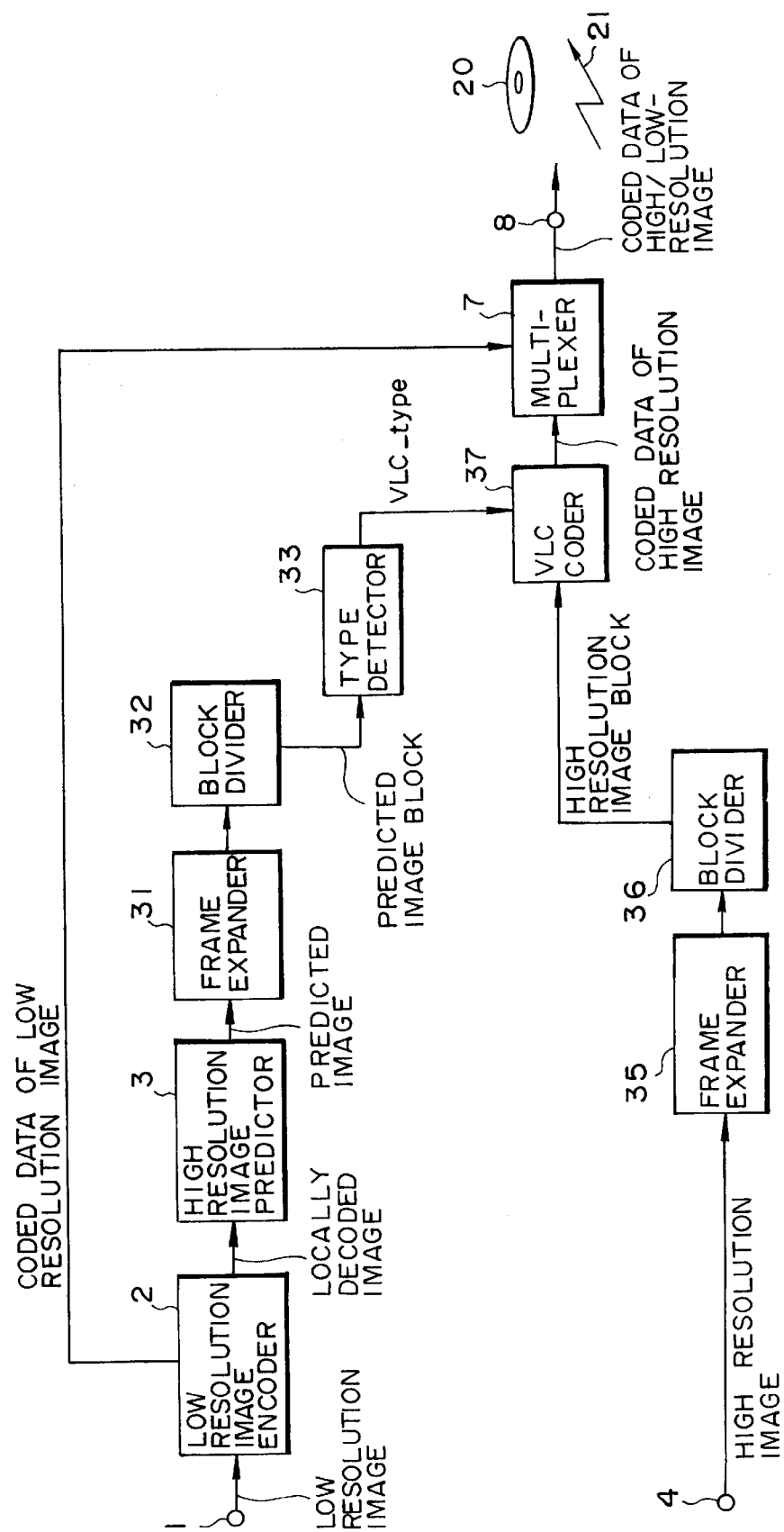
FIG. 18 is a block diagram illustrating still another embodiment of a coding apparatus according to the invention.

FIG. 18 illustrates a third embodiment of a coding apparatus according to the invention. The coding apparatus of this embodiment differs from that shown in FIG. 1 in that the exclusive-OR gate 34 is not used. The other parts are similar to those employed in FIG. 1, and those similar parts are denoted by similar reference numerals, and they are not described in further detail here.

In the previous embodiments, VLCs are assigned to the respective difference image blocks in such a manner as shown in FIGS. 8 and 9. Since each difference image block corresponds to a particular high resolution image block, it may also be possible to generate a VLC in accordance not to each difference image block but to each high resolution image block. In this case, the difference image is no longer required. The apparatus shown in FIG. 18 is a realization of such a coding apparatus.

In FIG. 18, a high resolution image block is generated by the block divider 36 and is supplied directly to the VLC coder 37. The VLC coder 37 generates a VLC for the given high resolution image block using the VLC tables shown in FIGS. 8 and 9 in accordance with the VLC_type (predicted image block). The other processes are performed in the same manner as in the coding apparatus shown in FIG. 1.

Figure 19:
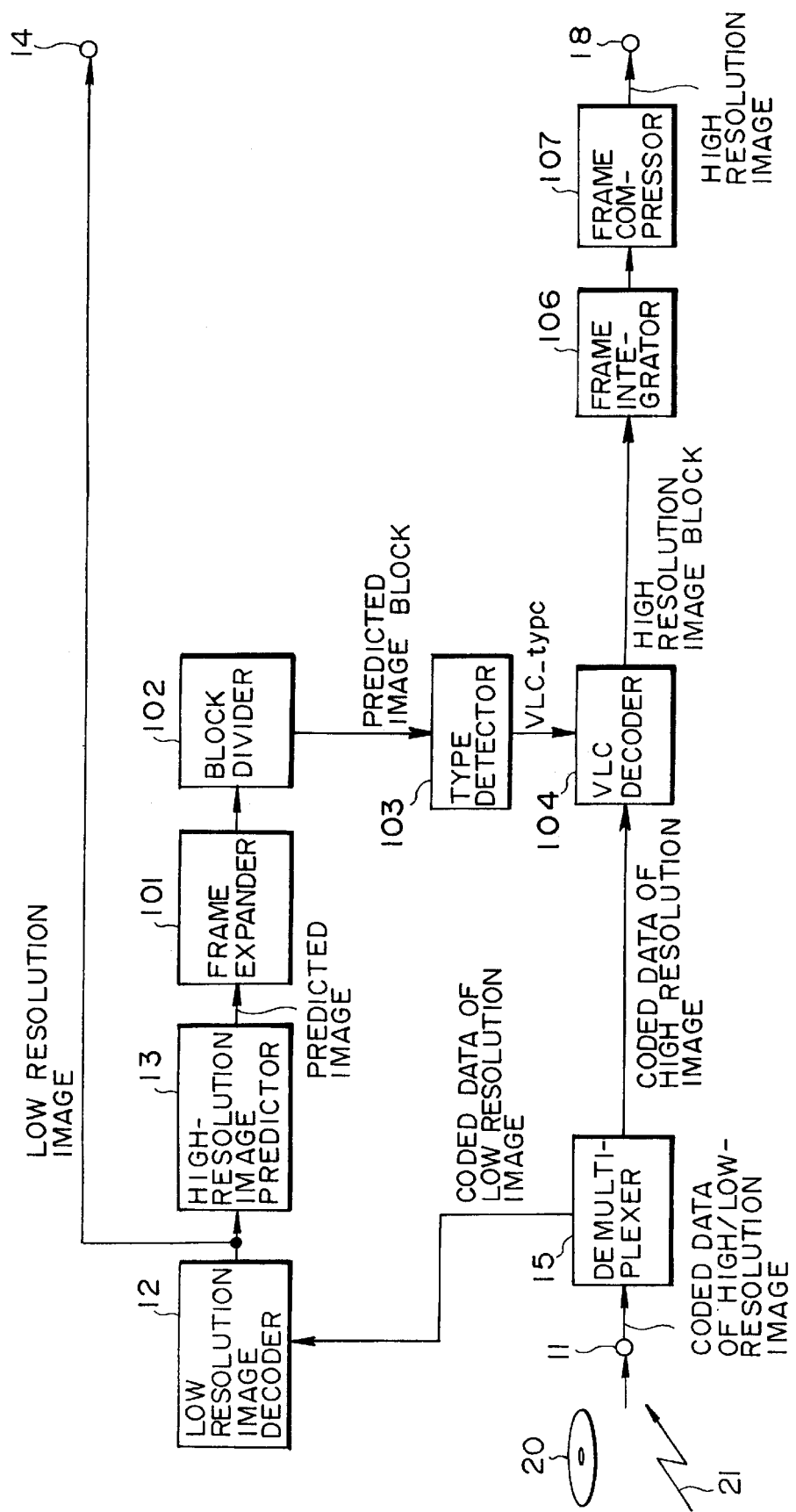
FIG. 19 is a block diagram illustrating a decoding apparatus corresponding to the coding apparatus shown in FIG. 18.
Figure 21:
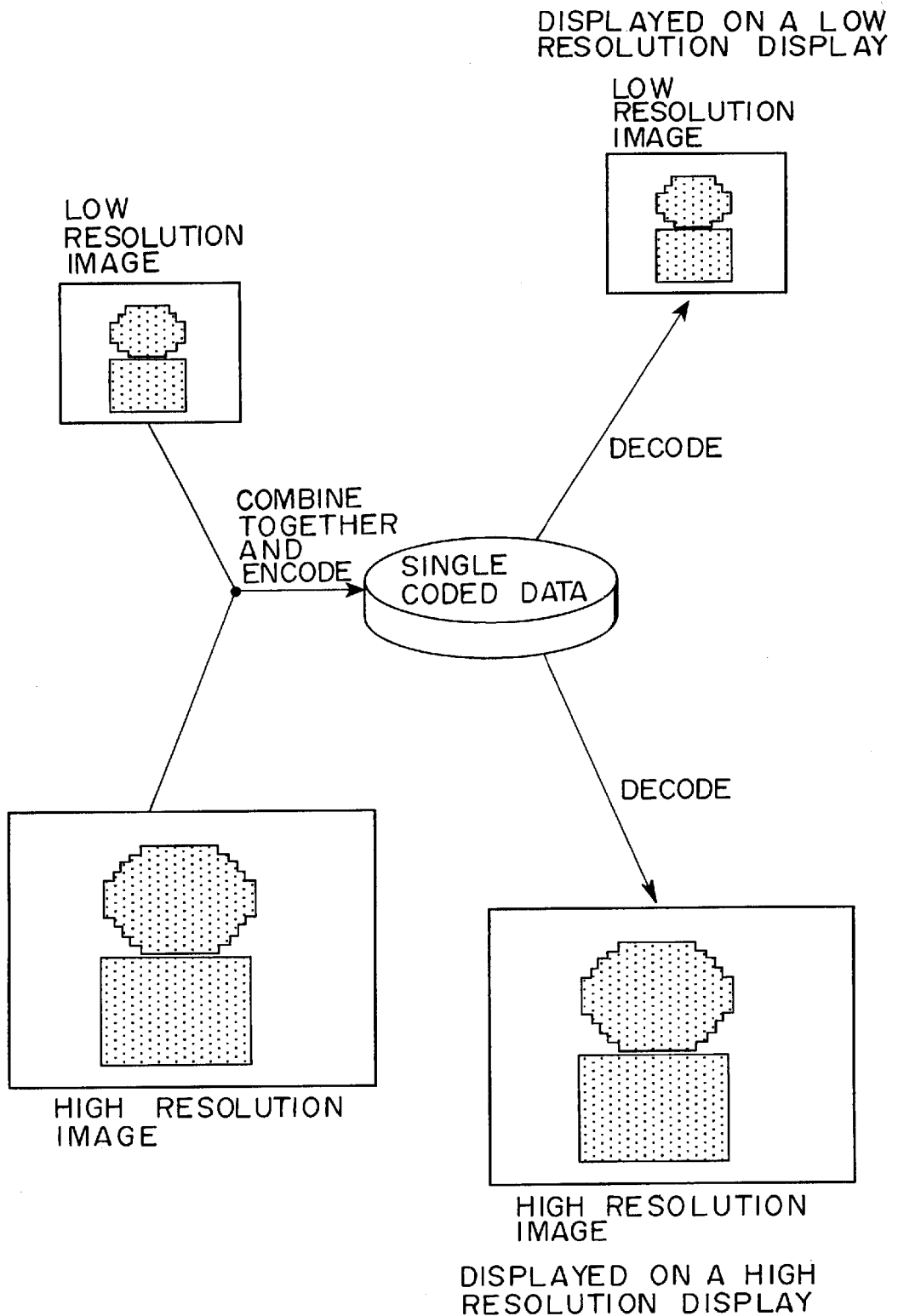
FIG. 21 is a schematic representation of the process of combining two image signals having different resolutions into a single bit-stream.
Figure 22:
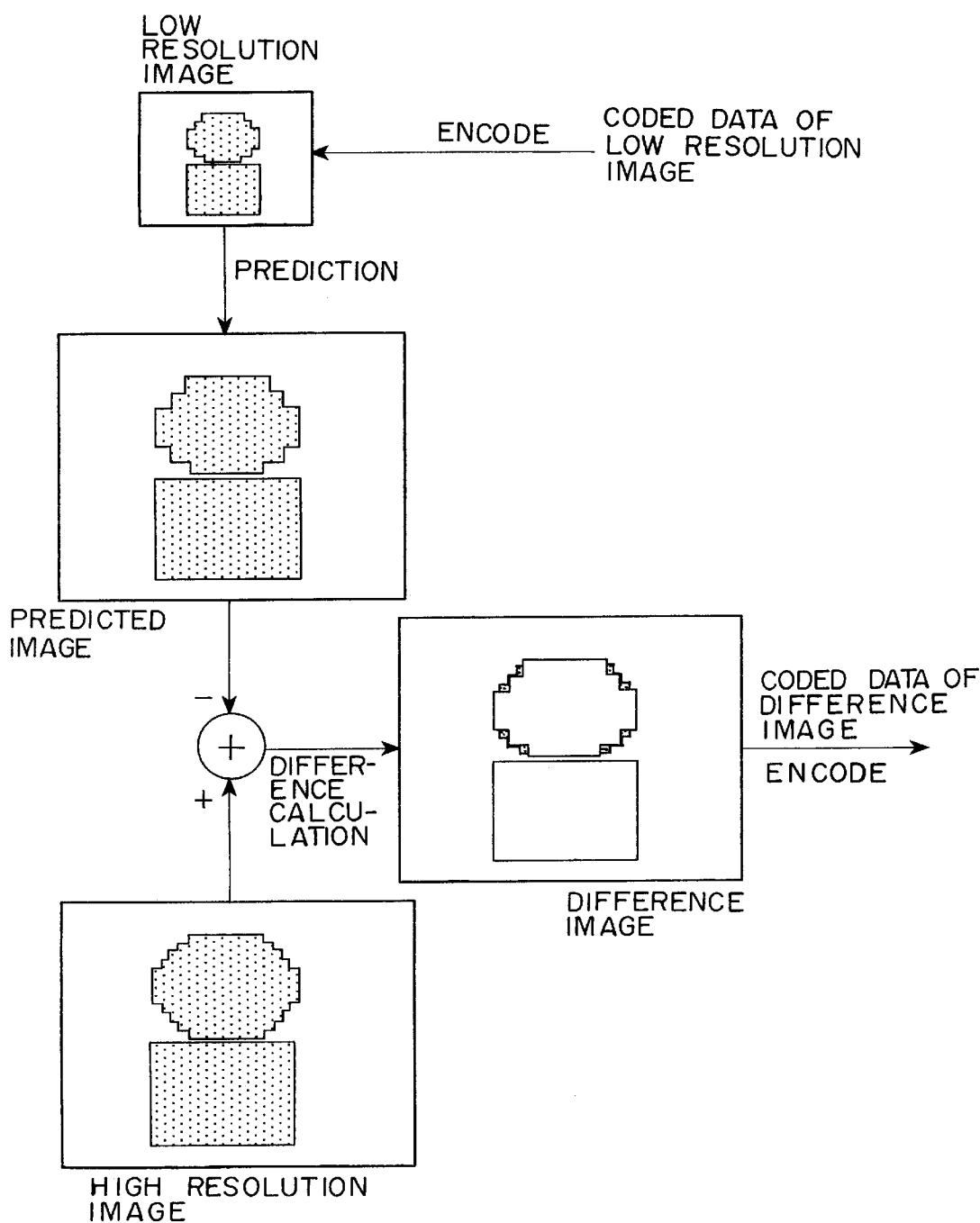
FIG. 22 is a schematic representation of the process of coding two image signals having different resolutions.
Figure 23:
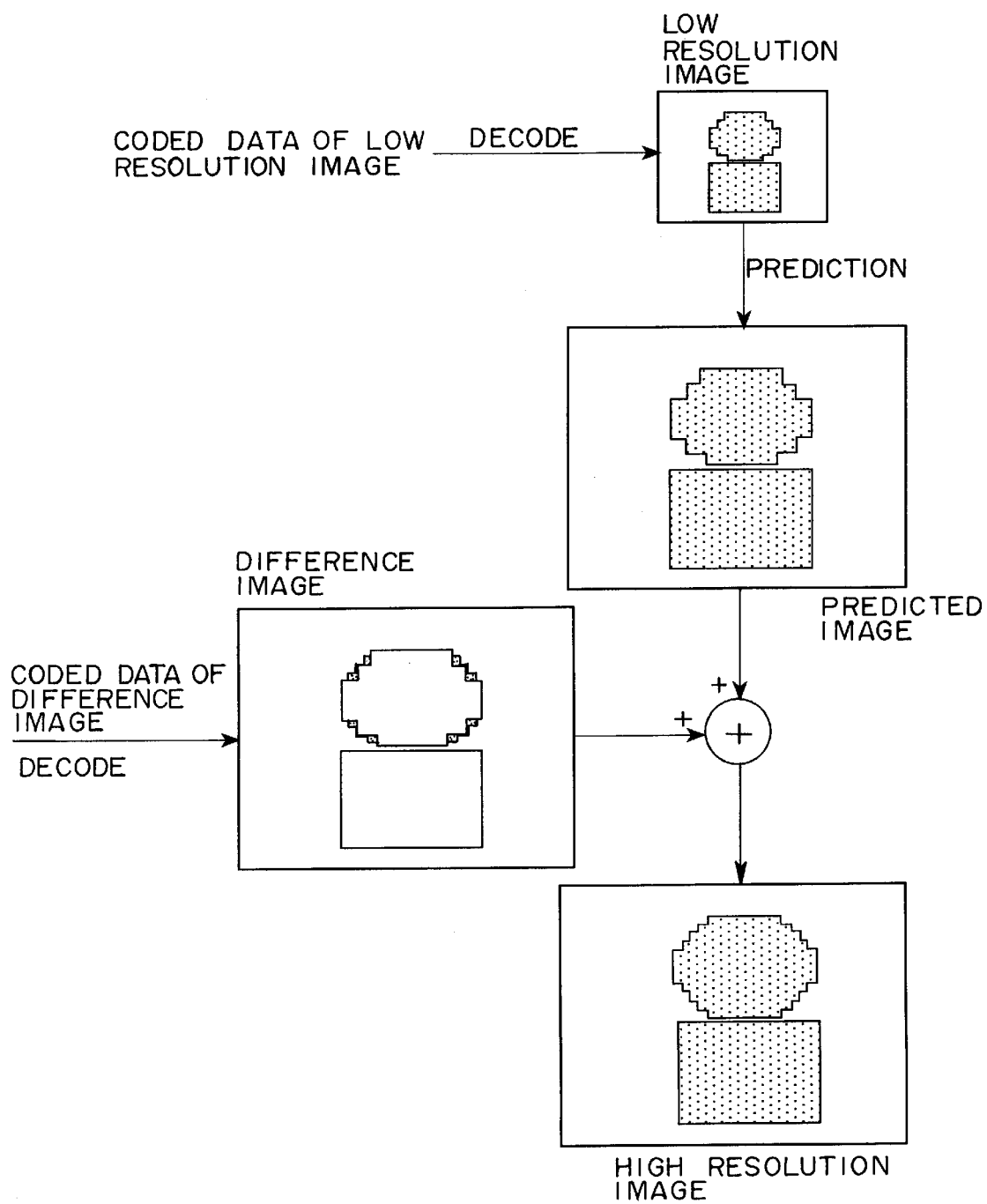
FIG. 23 is a schematic representation of the process of decoding two image signals having different resolutions.

FIG. 19 illustrate a decoding apparatus corresponding to the coding apparatus shown in FIG. 18. The decoding apparatus of the present embodiment differs from that shown in FIG. 10 in that the exclusive-OR gate 105 is not used. The other parts are similar to those of the decoding apparatus shown in FIG. 10. Those similar parts are denoted by similar reference numerals, and they are not described in further detail here.

In the coding apparatus shown in FIG. 18, the coded data generated by the VLC coder 37 is not a coded difference image but a coded high resolution image. Thus, the data recorded on the disk 20 includes coded low resolution image data and also coded high resolution image data corresponding to the low resolution image wherein these data are recorded in a multiplexed fashion.

In the case of the decoding apparatus shown in FIG. 10, the demultiplexer 15 separates difference image coded data from the input data. In contrast, in the decoding apparatus shown in FIG. 19, it is the coded high resolution image data that is separated by the demultiplexer 15. The VLC decoder 104 performs VLC-decoding operation on the coded high resolution image data with reference to the VLC_type block shown in FIGS. 8 and 9. As a result of the VLC-decoding operation, not a difference image block but a high resolution image block is generated by the VLC decoder 104.

In the above embodiments, a high resolution image is predicted from a low resolution image using a high resolution image predictor. However, if the frame of a low resolution image (FIG. 20A) is expanded and the expanded image is divided into blocks as shown in FIG. 20, the prediction of a high resolution image is no longer required.

Furthermore, in the above embodiments, each block is coded and decoded using VLCs. However, blocks may by coded and decoded using other techniques for example arithmetic codes.

When a low resolution image is a precisely reduced image of a high resolution image, there is a very high probability that no residual difference occurs in those blocks of VLC_type0 (also VLC_typeF) of the predicted image. Therefore, if irreversible (lossy) coding is allowed, the coding apparatus shown in FIG. 1, 12 or 18 may generate no codes for those blocks of VLC_type0, and decoding apparatus shown in FIGS. 10, 17 or 19 may regard those blocks as having no residual difference without having to read the codes further. This allows a further improvement in compression efficiency.

When reversible (lossless) coding is required, the coding apparatus may perform coding in the irreversible fashion described above and may insert a flag every proper unit of blocks, for example every line, thereby indicating whether all blocks are correctly coded or not wherein a correction code is added when there is an incorrectly coded block. Thus, a high compression efficiency can be achieved. In the decoding apparatus, the decoding may be performed while monitoring the flag indicating whether the blocks are correctly coded or not, and using the correction code following the flag if necessary. There is a tendency that incorrect blocks occur successively in space or time. Therefore, it is desirable that the variable length codes or arithmetic codes be constructed so that close points are easily represented by the correction codes.

The hard key signal has a less number of isolated points compared to other bilevel images. Even if there are isolated points in the hard key signal, the isolated points can be removed without causing significant problems. Therefore, if the hard key signal is coded in the irreversible manner described above, there is little probability that an error occurs. Even if an error occurs, the error will not be significant. Thus, an extremely high coding/decoding efficiency can be achieved by employing the above irreversible coding technique without encountering substantially no problems.

In the coding techniques described above, when the bit stream is decoded, it is impossible to know which coding table should be used to decode the difference image unless the decoded low resolution image is used. To make it possible to parse the bit stream without having to decode the low resolution image, the difference image may be coded in such a manner that the coded data of the difference image is grouped for each coding table and an additional code indicating how many codes there are in each group is placed at the beginning of each group.

In the present invention, as described above, a coding table is selected in accordance with the information detected by the type detector about each block of a high resolution image predicted from a low resolution image and the bilevel image is coded in a highly efficient fashion using the information about the predicted image.

The coding apparatus can rearrange the pixel locations in each block of the high resolution image using the pixel position exchanger thereby allowing the coding tables to be simplified. Similarly, the decoding apparatus can rearrange the pixel location in each block of the difference image for the same purpose.

The coding apparatus and decoding apparatus according to the present invention are particularly useful to code or decode hard key signals in an extremely efficient fashion.

In the method and apparatus for coding an image signal according to the invention, the coding table used to code a high resolution image is switched for each block including n×m pixels determined on the basis of a low resolution image.

In the method and apparatus for decoding an image signal according to the invention, the coding table used to decode a high resolution image is switched for each block including n×m pixels determined on the basis of a low resolution image.

In any case, the image can be coded or decoded in a highly efficient fashion.

Furthermore, in the recording medium according to the invention, a high resolution image is coded with variable length codes for each block including n×m pixels determined on the basis of a low resolution image. This makes it possible to record and reproduce a high-density image onto or from the recording medium.

Although the above embodiments of the invention are realized with hardware described in the respective block diagrams, the present invention may also be implemented using software in conjunction with a CPU and memory. That is, the algorithm of coding and/or decoding an image signal may be realized in the form of a computer program such as an image coding program and/or an image decoding program. In this case, the computer program is stored on a storage medium such as a semiconductor memory or a disk. Furthermore, the image coding program and/or the image decoding program may be supplied to a terminal or the like via a network.

The present invention has been described above with reference to the preferred embodiments. However, the invention is not limited to the details of these embodiments. Various modifications and applications may occur without departing from the spirit and scope of the present invention.

What is claimed is:

1. A coding apparatus for coding an image signal, comprising:

means for receiving a low resolution image signal consisting of a plurality of pixels as well as a high resolution image signal consisting of a plurality of pixels, said high resolution image signal having a higher resolution than said low resolution image signal;

first coding means for coding said low resolution image signal;

predicting means for predicting said high resolution image signal from said low resolution image signal thereby generating a predicted high resolution image signal;

judgement means for dividing said predicted high resolution image signal into a plurality of blocks each including n×m pixels, and then detecting a predetermined feature of each block and finally outputting a judgement code corresponding to said feature; and second coding means for selecting a coding table in accordance with said judgement code and then coding the n×m pixels in the corresponding block of said high resolution image signal using said selected coding table.

2. A coding apparatus according to claim 1, wherein said second coding means comprises:

means for calculating the difference between said high resolution image signal and said predicted high resolution image signal and outputting the resultant difference image signal; and means for selecting a coding table in accordance with said judgement code and then coding the n×m pixels in the corresponding block of said difference image using said selected coding table.

3. A coding apparatus according to claim 1, wherein:

said first coding means codes said low resolution image signal and outputs the resultant coded low resolution image signal, and said first coding means also decodes said coded low resolution image signal and outputs the resultant decoded low resolution image signal; and said predicting means predicts said high resolution image signal from said decoded low resolution image signal thereby generating said predicted high resolution image signal.

4. A coding apparatus according to claim 2, further comprising:

means for adding a predetermined number of pixels to said predicted high resolution image signal at its frame portion and outputting the resultant predicted high resolution image signal in the expanded form;

wherein said judgement means divides said predicted high resolution image signal in the expanded form into a plurality of block data, and then detects the predetermined feature of each block data and finally outputs a judgement code corresponding to said feature; and said second coding means selects a coding table in accordance with said judgement code and then codes the n×m pixels in the corresponding block of said high resolution image signal using said selected coding table.

5. A coding apparatus according to claim 1, further comprising:

means for adding a predetermined number of pixels to said predicted high resolution image signal at its frame portion and outputting the resultant predicted high resolution image signal in the expanded form; and means for adding a predetermined number of pixels to said high resolution image signal at its frame portion and outputting the resultant high resolution image signal in the expanded form;

wherein said judgement means divides said predicted high resolution image signal in the expanded form into a plurality of block data, and then detects the predetermined feature of each block data and finally outputs a judgement code corresponding to said feature; and said second coding means selects a coding table in accordance with said judgement code and then codes the n×m pixels in the corresponding block of said high resolution image signal in the expanded form using said selected coding table.

6. A coding apparatus according to claim 2, further comprising: means for rearranging the n×m pixels in each block of said difference image signal in accordance with said judgement code.

7. A coding apparatus according to claim 1, wherein in the operation of predicting said high resolution image signal from said low resolution image signal, said predicting means outputs the pixels of said low resolution image signal repeatedly thereby outputting said high resolution image signal.

8. A coding apparatus according to claim 1, wherein said low resolution image signal and said high resolution image signal are both a key signal.

9. A coding apparatus according to claim 1, wherein said low resolution image signal and said high resolution image signal are both a bilevel image signal.

10. A method of coding an image signal, comprising:

the step of receiving a low resolution image signal consisting of a plurality of pixels as well as a high resolution image signal consisting of a plurality of pixels, said high resolution image signal having a higher resolution than said low resolution image signal;

the first coding step of coding said low resolution image signal;

the predicting step of predicting said high resolution image signal from said low resolution image signal thereby generating a predicted high resolution image signal;

the detecting step of dividing said predicted high resolution image signal into a plurality of blocks each including n×m pixels, and then detecting a predetermined feature of each block and finally outputting a judgement code corresponding to said feature; and the second coding step of selecting a coding table in accordance with said judgement code and then coding the n×m pixels in the corresponding block of said high resolution image signal using said selected coding table.

11. A method of coding an image signal, according to claim 10, wherein said second coding step comprises:

the step of calculating the difference between said high resolution image signal and said predicted high resolution image signal and outputting the resultant difference image signal; and the pixel signal coding step of selecting a coding table in accordance with said judgement code and then coding the n×m pixels in the corresponding block of said difference image using said selected coding table.

12. A method of coding an image signal, according to claim 10, wherein:

said first coding step codes said low resolution image signal and outputs the resultant coded low resolution image signal, and also decodes said coded low resolution image signal and outputs the resultant decoded low resolution image signal; and said predicting step predicts said high resolution image signal from said decoded low resolution image signal thereby generating said predicted high resolution image signal.

13. A method of coding an image signal, according to claim 11, further comprising:

the step of adding a predetermined number of pixels to said predicted high resolution image signal at its frame portion and outputting the resultant predicted high resolution image signal in the expanded form;

wherein said detecting step divides said predicted high resolution image signal in the expanded form into a plurality of block data, and then detects the predetermined feature of each block data and finally outputs a judgement code corresponding to said feature; and said second coding step selects a coding table in accordance with said judgement code and then codes the n×m pixels in the corresponding block of said high resolution image signal using said selected coding table.

14. A method of coding an image signal, according to claim 10, further comprising:

the step of adding a predetermined number of pixels to said predicted high resolution image signal at its frame portion and outputting the resultant predicted high resolution image signal in the expanded form; and the step of adding a predetermined number of pixels to said high resolution image signal at its frame portion and outputting the resultant high resolution image signal in the expanded form;

wherein said detecting step divides said predicted high resolution image signal in the expanded form into a plurality of block data, and then detects the predetermined feature of each block data and finally outputs a judgement code corresponding to said feature; and said second coding step selects a coding table in accordance with said judgement code and then codes the n×m pixels in the corresponding block of said high resolution image signal in the expanded form using said selected coding table.

15. A method of coding an image signal, according to claim 11, further comprising the rearrangement step of rearranging the n×m pixels in each block of said difference image signal in accordance with said judgement code.

16. A method of coding an image signal, according to claim 10, wherein, in the operation of predicting said high resolution image signal from said low resolution image signal in said predicting step, the pixels of said low resolution image signal are output repeatedly thereby outputting said high resolution image signal.

17. A method of coding an image signal, according to claim 10, wherein said low resolution image signal and said high resolution image signal are both a key signal.

18. A method of coding an image signal, according to claim 10, wherein said low resolution image signal and said high resolution image signal are both a bilevel image signal.

19. A decoding apparatus for decoding a coded data, said coded data including a coded low resolution image signal generated by coding a low resolution image signal and also including a coded high resolution image signal generated by coding a high resolution image signal, said decoding apparatus comprising:

first decoding means for decoding said coded low resolution image signal thereby generating a decoded low resolution image signal;

predicting means for predicting said high resolution image signal from said decoded low resolution image signal thereby generating said predicted high resolution image signal;

judgement means for dividing said predicted high resolution image signal into a plurality of blocks each including n×m pixels, and then detecting a predetermined feature of each block and finally outputting a judgement code corresponding to said feature; and second decoding means for selecting a coding table in accordance with said judgement code and then decoding said coded high resolution image signal using said selected coding table thereby generating a decoded high resolution image signal.

20. A decoding apparatus for decoding a coded data, according to claim 19, wherein:

said coded high resolution image signal is a coded difference image signal generated by coding a difference image representing the difference between said high resolution image signal and the predicted high resolution image signal generated in the coding process; and said second decoding means comprises:

means for selecting a coding table in accordance with said judgement code and then decoding said coded difference image signal using said selected coding table thereby generating a decoded difference image signal; and means for adding said decoded difference image signal and said predicted high resolution image signal thereby generating a decoded high resolution image signal.

21. A decoding apparatus for decoding a coded data, according to claim 19, further comprising:
  means for adding a predetermined number of pixels to said predicted high resolution image signal at its frame portion thereby generating a predicted high resolution image signal in the expanded form;
  wherein said judgement means divides said predicted high resolution image signal in the expanded form into a plurality of block data, and then detects the predetermined feature of each block data and finally outputs a judgement code corresponding to said feature; and
  said second decoding means selects a decoding table in accordance with said judgement code and decodes said high resolution image signal using said selected decoding table.

22. A decoding apparatus for decoding a coded data, according to claim 20, further comprising:
  means for adding a predetermined number of pixels to said predicted high resolution image signal at its frame portion thereby generating a predicted high resolution image signal in the expanded form;
  wherein said judgement means divides said predicted high resolution image signal in the expanded form into a plurality of block data, and then detects the predetermined feature of each block data and finally outputs a judgement code corresponding to said feature; and
  said second decoding means selects a decoding table in accordance with said judgement code and decodes said coded difference image signal using said selected decoding table thereby generating a decoded difference image signal.

23. A decoding apparatus for decoding a coded data, according to claim 20, further comprising: means for rearranging the n×m pixels in each block of said decoded difference image signal in accordance with said judgement code.

24. A decoding apparatus for decoding a coded data, according to claim 19, wherein in the operation of predicting said high resolution image signal from said low resolution image signal, said predicting means outputs the pixels of said low resolution image signal repeatedly thereby outputting said high resolution image signal.

25. A decoding apparatus for decoding a coded data, according to claim 19, wherein said low resolution image signal and said high resolution image signal are both a key signal.

26. A decoding apparatus for decoding a coded data, according to claim 19, wherein said low resolution image signal and said high resolution image signal are both a bilevel image signal.

27. A method of decoding a coded data, said coded data including a coded low resolution image signal generated by coding a low resolution image signal and also including a coded high resolution image signal generated by coding a high resolution image signal, said method comprising:
  the first decoding step of decoding said coded low resolution image signal thereby generating a decoded low resolution image signal;
  the predicting step of predicting said high resolution image signal from said decoded low resolution image signal thereby generating said predicted high resolution image signal;
  the detecting step of dividing said predicted high resolution image signal into a plurality of blocks each including n×m pixels, and then detecting a predetermined feature of each block and finally outputting a judgement code corresponding to said feature; and
  second decoding means for selecting a coding table in accordance with said judgement code and then decoding said coded high resolution image signal using said selected coding table thereby generating a decoded high resolution image signal.

28. A method of decoding a coded data, according to claim 27, wherein:
  said coded high resolution image signal is a coded difference image signal generated by coding a difference image representing the difference between said high resolution image signal and the predicted high resolution image signal generated in the coding process; and
  said second decoding step comprises:
    the step of selecting a coding table in accordance with said judgement code and then decoding said coded difference image signal using said selected coding table thereby generating a decoded difference image signal; and
    the step of adding said decoded difference image signal and said predicted high resolution image signal thereby generating a decoded high resolution image signal.

29. A method of decoding a coded data, according to claim 27, further comprising:
  the step of adding a predetermined number of pixels to said predicted high resolution image signal at its frame portion thereby generating a predicted high resolution image signal in the expanded form;
  wherein said detecting step divides said predicted high resolution image signal in the expanded form into a plurality of block data, and then detects the predetermined feature of each block data and finally outputs a judgement code corresponding to said feature; and
  said second decoding step selects a decoding table in accordance with said judgement code and decodes said high resolution image signal using said selected decoding table.

30. A method of decoding a coded data, according to claim 28, further comprising:
  the step of adding a predetermined number of pixels to said predicted high resolution image signal at its frame portion thereby generating a predicted high resolution image signal in the expanded form;
  wherein said detecting step divides said predicted high resolution image signal in the expanded form into a plurality of block data, and then detects the predetermined feature of each block data and finally outputs a judgement code corresponding to said feature; and
  said second decoding step selects a decoding table in accordance with said judgement code and decodes said coded difference image signal using said selected decoding table thereby generating a decoded difference image signal.

31. A method of decoding a coded data, according to claim 28, further comprising: the rearrangement step of rearranging the n×m pixels in each block of said decoded difference image signal in accordance with said judgement code.

32. A method of decoding a coded data, according to claim 27, wherein in the operation of predicting said high resolution image signal from said low resolution image signal in said predicting step, the pixels of said low resolution image signal are output repeatedly thereby outputting said high resolution image signal.

33. A method of decoding a coded data, according to claim 27, wherein said low resolution image signal and said high resolution image signal are both a key signal.

34. A method of decoding a coded data, according to claim 27, wherein said low resolution image signal and said high resolution image signal are both a bilevel image signal.

* * * * *